(12) United States Patent
Mueller et al.

(10) Patent No.: US 9,149,877 B1
(45) Date of Patent: Oct. 6, 2015

(54) INTERACTION BETWEEN A KEY DUPLICATION HOUSING AND A KEY BLANK CARRIER

(75) Inventors: Mike Mueller, Phoenix, AZ (US); George Lynn Hagen, Las Vegas, NV (US); Scott Basham, Chandler, AZ (US); Mark Tarter, Mesa, AZ (US); Carl Ito, Scottsdale, AZ (US); Kenneth C. Booth, Mesa, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 894 days.

(21) Appl. No.: 13/292,023

(22) Filed: Nov. 8, 2011

Related U.S. Application Data

(63) Continuation-in-part of application No. 13/183,982, filed on Jul. 15, 2011.

(60) Provisional application No. 61/364,644, filed on Jul. 15, 2010, provisional application No. 61/411,148, filed on Nov. 8, 2010, provisional application No. 61/413,099, filed on Nov. 12, 2010, provisional application No. 61/497,468, filed on Jun. 15, 2011.

(51) Int. Cl.
  *B23C 3/35* (2006.01)
(52) U.S. Cl.
  CPC . *B23C 3/35* (2013.01); *B23C 3/355* (2013.01); *Y10T 409/300952* (2015.01); *Y10T 409/301008* (2015.01); *Y10T 409/301064* (2015.01)
(58) Field of Classification Search
  CPC .................................. B23C 3/355; B23C 3/35
  USPC ........ 409/81–83; 76/110; 206/37.1, 349, 461, 206/758
  See application file for complete search history.

(56) References Cited

U.S. PATENT DOCUMENTS

| | | | |
|---|---|---|---|
| 2,148,667 A | | 2/1939 | Yoskowitz et al. |
| 3,116,665 A | | 1/1964 | Reisner |
| 3,245,149 A | * | 4/1966 | Haggstrom ..................... 33/539 |
| 3,323,420 A | | 6/1967 | Roxburgh |
| 3,358,561 A | | 12/1967 | Roxburgh et al. |
| 3,413,892 A | | 12/1968 | Casey et al. |
| 3,424,056 A | * | 1/1969 | Stoll et al. ....................... 409/83 |
| 3,442,174 A | | 5/1969 | Weiner et al. |
| 3,602,092 A | | 8/1971 | Richens |
| 3,682,041 A | | 8/1972 | Essig |
| 3,796,130 A | | 3/1974 | Gartner |

(Continued)

FOREIGN PATENT DOCUMENTS

| | | | | |
|---|---|---|---|---|
| DE | 10031713 A1 | * | 1/2002 | ................ B23C 3/35 |
| DE | 10341627 A1 | * | 4/2005 | .............. B23C 3/355 |
| WO | WO2008/066857 A2 | | 6/2008 | |

*Primary Examiner* — Sunil K Singh
*Assistant Examiner* — Ryan Rufo
(74) *Attorney, Agent, or Firm* — Finnegan, Henderson, Farabow, Garrett and Dunner LLP

(57) ABSTRACT

A key duplication system may include a housing, a key blank receiving aperture, a cutter and a clamp adjacent to the receiving aperture, wherein the key blank is guided to a predetermined position in relation to the cutter through engagement of a carrier with the housing. A method of aligning a key blank blade with a key blank carrier in relation to a cutter may include guiding a key blade into a cutting position through contact with a key blade receiving aperture, securing at least a portion of the carrier with a clamp, cutting a key bit pattern into the key blank blade and releasing the key blank.

13 Claims, 17 Drawing Sheets

(56) References Cited

U.S. PATENT DOCUMENTS

| | | | |
|---|---|---|---|
| 3,865,011 A | 2/1975 | Patriquin | |
| 3,978,764 A | 9/1976 | Patriquin | |
| 4,159,783 A | 7/1979 | Crasnianski | |
| 4,666,351 A | 5/1987 | Marchal | |
| 4,741,652 A | 5/1988 | Marchal | |
| 4,752,876 A | 6/1988 | Couch et al. | |
| 5,042,330 A * | 8/1991 | Lo | 76/110 |
| 5,172,829 A | 12/1992 | Dellicker, Jr. | |
| 5,201,203 A * | 4/1993 | Almblad | 70/406 |
| 5,271,698 A * | 12/1993 | Heredia et al. | 409/82 |
| 5,311,758 A * | 5/1994 | Neitzke et al. | 70/456 R |
| 5,360,299 A * | 11/1994 | Oliana | 409/83 |
| 5,538,374 A * | 7/1996 | Cole et al. | 409/132 |
| 5,807,042 A | 9/1998 | Almblad et al. | |
| 6,543,972 B1 * | 4/2003 | Cimino | 409/83 |
| 6,895,100 B1 * | 5/2005 | Pacenzia et al. | 382/100 |
| 2001/0033781 A1 * | 10/2001 | Wills et al. | 409/81 |
| 2002/0141843 A1 * | 10/2002 | Mueller et al. | 409/132 |
| 2006/0062644 A1 * | 3/2006 | Foscan et al. | 409/81 |
| 2007/0224008 A1 * | 9/2007 | Bass et al. | 409/132 |
| 2008/0145163 A1 * | 6/2008 | Freeman et al. | 409/83 |
| 2011/0268525 A1 * | 11/2011 | Karpowitz et al. | 409/225 |
| 2011/0297691 A1 * | 12/2011 | Freeman | 221/8 |
| 2012/0014762 A1 * | 1/2012 | Ryai, Sr. et al. | 409/225 |

* cited by examiner

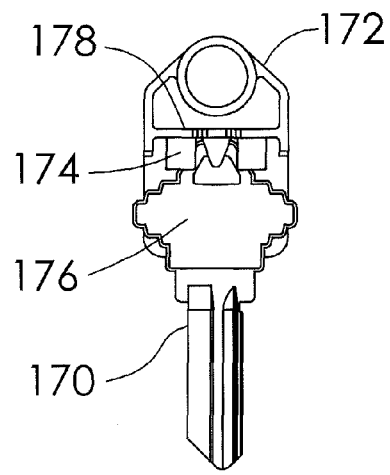
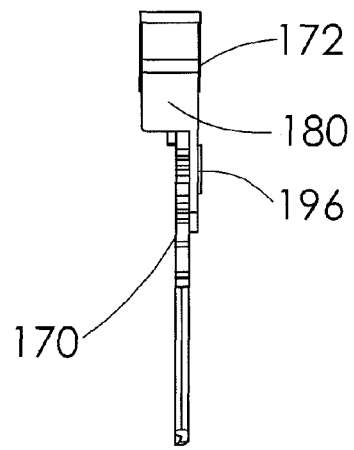
FIG. 12A  FIG. 12B
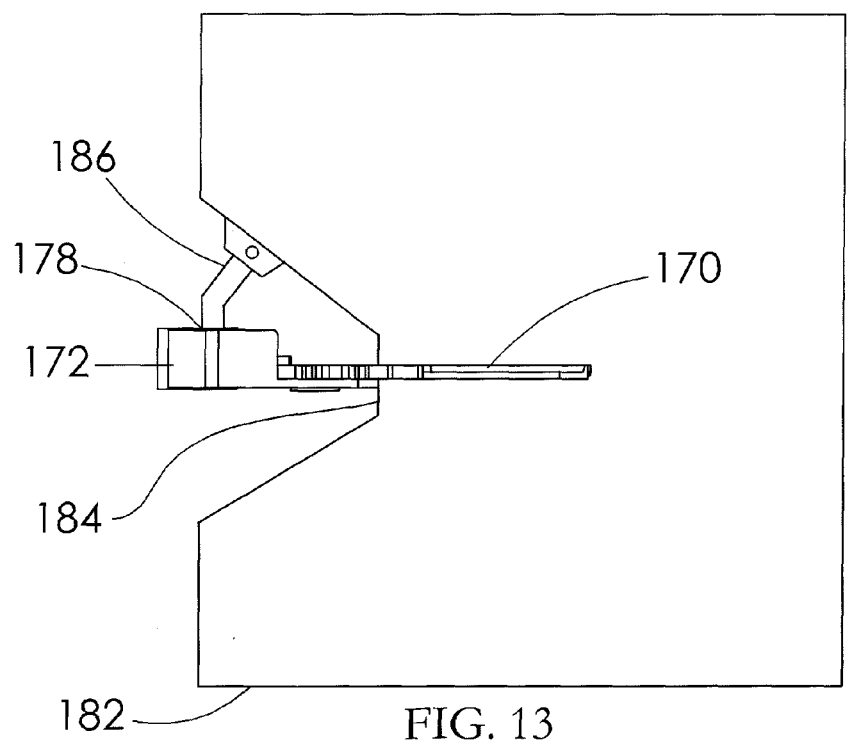
FIG. 13

INTERACTION BETWEEN A KEY DUPLICATION HOUSING AND A KEY BLANK CARRIER

CROSS REFERENCE TO RELATED APPLICATIONS

This application is a continuation-in-part application of U.S. patent application Ser. No. 13/183,982 to Mueller et al. entitled "Key Blank and Carrier Adapted for Positioning a Key Blank in a Cutter During Bit Cutting," which was filed on Jul. 15, 2011, the disclosure of which is hereby incorporated herein by reference. This document also claims the benefit of the filing dates of U.S. Provisional Patent Application 61/413,099 to Hagen et al. entitled "Key Duplication Machine Cutting System," which was filed on Nov. 12, 2010, 61/497,468 to Hagen et al. entitled "Key Packaging and Duplication Systems," which was filed on Jun. 15, 2011, 61/411,148 to Mueller et al. entitled "Key Duplication Machine Identification System" which was filled on Nov. 8, 2010, and 61/364,644 to Hagen et al. entitled "Key Duplication Packaging and Standard Reference Features," which was filed Jul. 15, 2010, the disclosures of all of which are hereby incorporated herein in their entirety by this reference.

BACKGROUND

1. Technical Field

Aspects of this document relate generally to key duplication. More specific implementations involve public use key cutting, key duplication and key vending systems for reproducing keys. Some specific implementations use a key blank carrier to assist in aligning a key blank with a key blank cutter to assist in accurately cutting the key blank.

2. Background Art

Conventionally, when a master key for opening a lock is duplicated, it is duplicated by first classifying the master key to be able to identify an appropriate key blank for the duplicate key, selecting the appropriate key blank to match the master key, placing the selected key blank in a key cutter, and cutting the bit pattern of the master key into a blade of the key blank. Methods such as tracer bars and image capture are known for use in identifying a master key bit pattern.

Conventional systems have required the operation skills of a trained worker to properly select the appropriate key blank. An example of an elaborate system used to assist a trained worker in selecting an appropriate key blank and appropriately positioning the appropriate key blank and master key for cutting is disclosed in U.S. Pat. No. 5,443,339 to Heredia et al., titled "Method and Apparatus for Aligning and Cutting Single-sided and Double Sided Keys." In Heredia, a plurality of clamping units, each comprising its own clamp and cutter fixturing is provided. The trained worker selects an appropriate key blank and an appropriate clamping unit for the particular key blank and clamps the key blank into the unit. Then the trained worker couples the clamping unit with a cutting wheel for cutting. More recent master key identification systems, such as that disclosed in U.S. Pat. No. 6,836,553 to Campbell et al., titled "Key Identification System," the disclosure of which is hereby incorporated herein by reference, automatically identifies the appropriate key blank and indicates that number for key selection.

A recent key duplication system described in International Application Number PCT/US2007/024522 to Freeman, et al. titled "Fully Automatic Key Duplicating Machine with Automatic Key Model Identification System" sought to reduce the need for the operational skills of a trained worker by automatically identifying master keys and automatically cutting and dispensing a duplicate key from a limited selection of keys within the key duplication system. Another recent key duplication system described in U.S. Pat. No. 7,890,878 to Bass et al., titled "Object Identification System," discloses a system that identifies an appropriate key blank by flashing a light adjacent the appropriate key blank on a product display next to a key blank cutter so that the user or a trained worker can select the appropriate key for insertion into the key blank cutter. Other systems require changing of clamps for different key blank models to enable secure positional clamping of the different key blank models in relation to the cutting wheel of a key blank cutter.

Each key blank type and model is a little bit, and sometimes a lot, different from the others in its relative dimensions and keyway dimensions and placements. As a result, efforts to eliminate the necessity for the operation skills of a trained worker has yielded difficulties in enabling a system to cut the wide variety of master key types and models accurately with little or no skill have yielded a relatively high rate of miscut keys for reasons such as an incorrect key blank being selected, a key blank being inserted backwards or not being inserted in far enough, and from a key blank being moved during cutting due to not being clamped securely. Each of these issues may result in a duplicate key being cut that does not match the master key and will not work in the lock. Many times, however, the user who cuts a key or even the trained worker who cuts a key is not aware that the duplicate key has an error until the user tries the key in the lock at home and is frustrated that another trip to the store is required to replace the miscut key.

SUMMARY

A first aspect of the disclosure comprises a key duplication system comprising a key duplication system housing, a key blank receiving aperture sized to receive at least a key blank blade, at least one cutter within the housing adjacent to the at least one key blank receiving aperture, and at least one key blank carrier clamp adjacent to the at least one key blank receiving aperture, the at least one key blank carrier clamp positionable to securely contact an outer surface of the key blank carrier, wherein the key blank blade is guided to a predetermined position in relation to the at least one key blank cutter through mechanical engagement of the outer surface of the key blank carrier and at least a portion of the key blank receiving aperture, wherein the key blank carrier clamp is positionable to clamp the key blank carrier in a cutting position in relation to the at least one cutter, and wherein the key blank blade is in the predetermined position when the key blank carrier is in the cutting position.

Particular implementations and embodiments may comprise one or more of the following. The at least one key blank receiving aperture may comprise a perimeter shape configured to match a corresponding shape of the cross sectional outer surface of the one key blank carrier. The perimeter shape may comprise at least one of a ridge or groove configured to match a corresponding groove or ridge on the outer surface of the key blank carrier. The at least one key blank receiving aperture may comprise a plurality of angled surfaces adjacent to the at least one key blank receiving aperture, the plurality of angled surfaces each angling away from the at least one key blank receiving aperture to form a tapered entry port between a user and the at least one key receiving aperture. At least one key blank receiving aperture may be configured to receive the key blank carrier in a frontal or a lateral orientation into the at least one key blank receiving aperture. The system may comprise a digital reader coupled to the housing and angled toward to the at least one key blank receiving aperture, the digital reader positioned to read an identification code affixed on an outer surface of the key blank carrier when the key blank blade is received by the at least one key blank receiving aperture. A light may be included adjacent to the at least one key receiving aperture and oriented to pass a beam of light through an opening placed on the key blank carrier when the key blank carrier is positioned at a fully inserted position into the at least one key blade receiving aperture. At least one movable guard may be adjacent to the at least one key blank receiving aperture, the movable guard movable to block the at least a portion of the at least one key blank receiving aperture. A pressure sensor may be coupled to the housing and positioned for activation by the key blank when the key blank carrier is positioned at a fully inserted position into the at least one key blank receiving aperture. The at least one key blank receiving aperture may further comprise a pivotal support, wherein by axially rotating the pivoting support, the at least one key blade aperture rotates. The at least one key blank carrier clamp may be further positioned to engage a portion of the outer surface of the key blank carrier extending from the key blank head. The at least one key blank carrier clamp may be further positioned to engaged a portion of the key blank carrier in direct contact with the key blank blade. The at least one cutter may comprise a constant speed motor driving a cutting wheel. The key blank receiving aperture may be on a first side of the housing. The key blank receiving aperture may be enclosed within the housing.

Another aspect of the disclosure comprises a method of duplicating a key in a key duplication system, the method comprising aligning a key blank blade coupled to a key blank carrier in a predetermined cutting location in relation to at least one key blank cutter within a key duplication system housing, securing at least a portion of the key blank carrier with the at least one key blank carrier clamp coupled to the key duplication housing, cutting a key bit pattern into the key blank blade with a cutter mounted within the key duplication housing, and releasing the at least one key blank carrier clamp after cutting the blank blade.

Particular implementations and embodiments may comprise one or more of the following. Cutting a second side of the key blank blade after axially rotating the key blank carrier 180 degrees between cutting a first side and the second side. Permitting a user to rotate the key blank carrier 180 degrees to cut a second side of the key blank blade. Aligning the key blank blade may further comprise aligning the key blank blade at the predetermined location through receiving the alignment feature on the key blank carrier into a corresponding shaped alignment feature on a key blank receiving aperture on a surface of the key duplication system adjacent to the at least one key blank cutter. The alignment feature on the key blank carrier may be coupled and extended to the key blank head and wherein aligning the key blank blade comprises receiving the alignment feature on the key blank carrier through the outer surface of a key blank carrier head corresponding to the key blank receiving aperture. The at least one key blank carrier clamp may be configured to tighten on the at least a portion of the key blank carrier after the key blank carrier is fully inserted into the key duplication housing. The at least one key blank carrier clamp clamps the key blank carrier head after the key blank carrier is positioned at a fully inserted position into the at least one key blank receiving aperture. The at least one key blank carrier clamp clamps the key blank carrier sleeve after the key blank carrier is positioned at a fully inserted position into the at least one key blank receiving aperture. The at least one key blank cutter releases a blank key from the key blank carrier through the at least one key blank cutter removing at least a portion of the key blank carrier. Cutting the portion of the key blank carrier may further comprise cutting a security clip affixed on the key blank carrier. The at least one key blank cutter may cut the second side of the key blank after the key is manually rotated 180 degrees. The at least one key blank cutter may cut the second side of the key blank after the key is automatically rotated 180 degrees. The at least one key blank cutter may normalize a distance between a shoulder of the blank key and a first bit of a key bit pattern by trimming a portion of the shoulder of the key blank. The at least one key blank cutter may remove burs from the key blank blade by passing the at least one key blank cutter twice on the key blade.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Particular illustrative implementations will hereinafter be described in conjunction with the appended drawings, where like designations denote like elements, and:

FIG. 12A, 12B illustrate front and side views of a key blank carrier comprising a key blank recess configured to receive a key blank head;

FIG. 13 illustrates a simplified side view of a key blank receiving aperture coupled with a key blank clamp implemented adjacent to the receiving aperture;

DESCRIPTION

This disclosure, its aspects and implementations, are not limited to the specific components or assembly procedures disclosed herein. Many additional components and assembly procedures known in the art consistent with the intended key duplication systems and/or assembly procedures for key duplication systems will become apparent from this disclosure. Accordingly, for example, although particular key duplication systems and components are disclosed, such systems and implementing components may comprise any shape, size, style, type, model, version, measurement, concentration, material, quantity, and/or the like as is known in the art for such systems and implementing components, consistent with the intended operation of a key duplication system.

Figure 1:
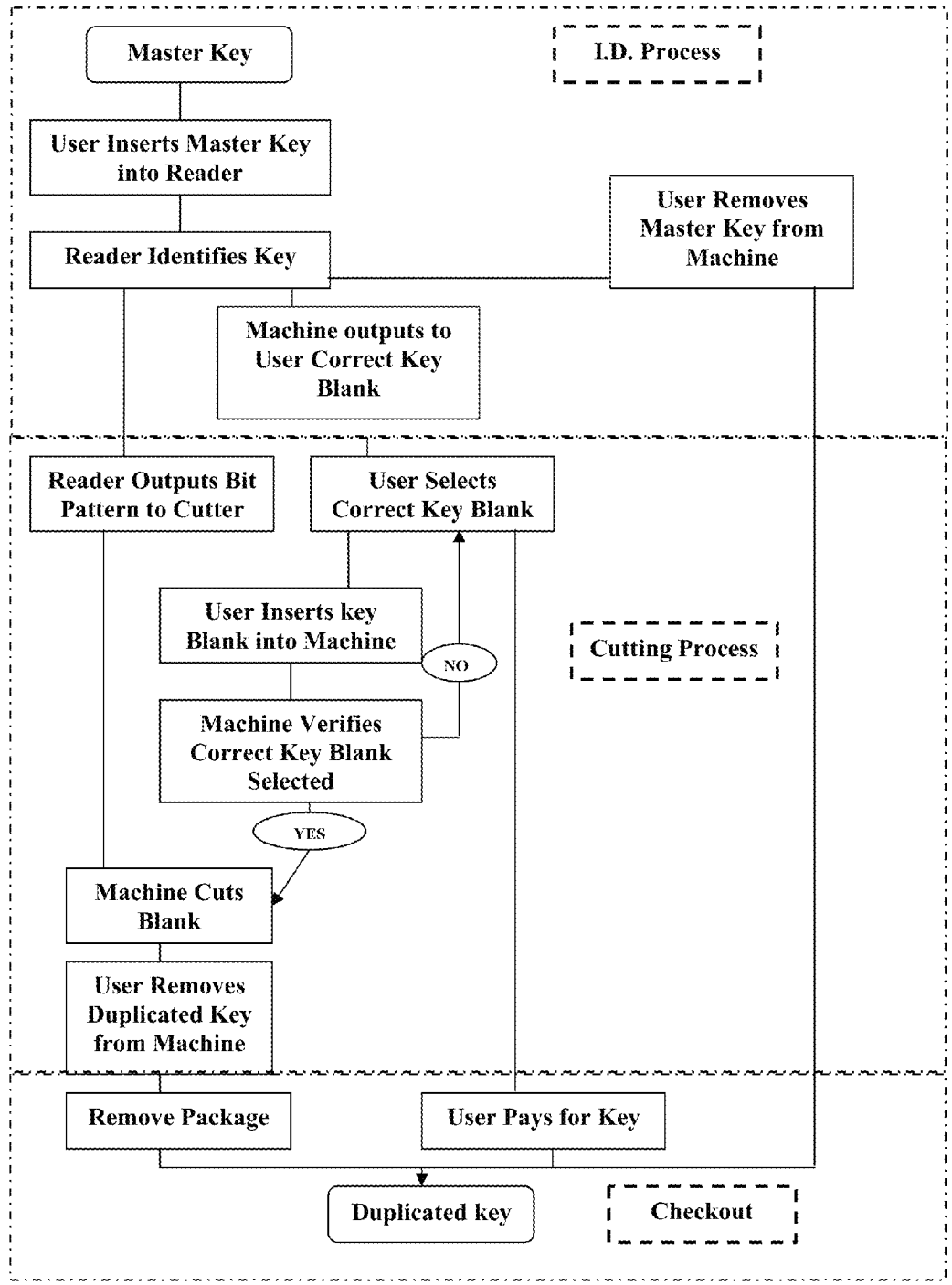
FIG. 1 is a block diagram of a specific key duplication process.

Particular implementations of a key cutting system with standard reference features may include a key blank cutter to cut a key blank contained in a key blank carrier, a key blank carrier receiving aperture and a key blank carrier clamp. The standard reference features of the key blank receiving aperture may allow any key blank brand model contained in a key blank carrier to interface with the a key cutting system and may align a key blank carrier within a key cutting system with respect to a key blank cutter. An overview of a process of identifying, cutting and selling a duplicate key is illustrated in FIG. 1. In particular embodiments, the key blank may be vended from an associated key blank vending system in communication with the master key identifier. In other particular embodiments, other additional methods and/or system components may be used as well. The specific identification process used to identify the master key make, model and bit pattern for selection of an appropriate key blank is not crucial to the present disclosure and any method may be used in combination with the present disclosure. By way of a non limiting example particular implementations of the key identification process and apparatus may comprise simple contact sensor, such as a Hall-Effect sensor that traces the key bit pattern, or a simple non-contact sensor, such as a see-through (or thru-beam) sensor, or a combination thereof to trace a master key's bit pattern. Other implementations may include any other key identification method or structure known in the art including, but not limited to, image recognition and full or partial user identification of the master key from a display. The specific cutting and checkout processes are also not crucial to the present disclosure and any discussion of them provided herein is provided as an example for clarity of discussion and is not intended as a limitation for use of the key blank carriers, cutters or related components for cutting a duplicate key discussed.

Figure 6:
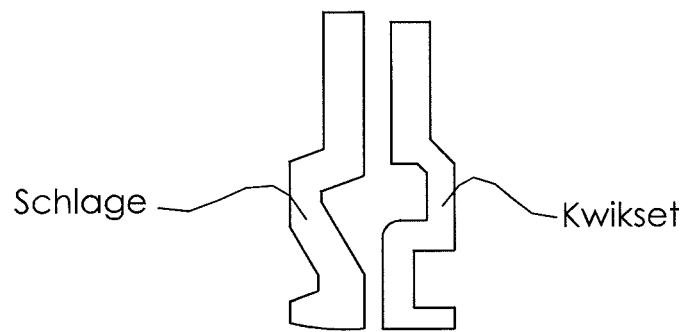
FIG. 6 is a front view of a two key types of Schlage and Kwikset placed next to each other to show their respective blade profiles.

In addition, a trained worker may face difficulty in finding an appropriate clamp for each type of key blanks Designing a universal clamp capable of holding different key blade surfaces securely and automatically is also difficult. Each key type comprises a key blade surface that is a little different. FIG. 6 illustrates an example of two of the most common key types with their respective cross-sections. As this Figure illustrates, a single clamp that can secure both of these key blades and still leave room for a key blade cutter to cut the key blade is difficult due to the unique key blade surfaces. Even though some key types may share some commonalties on their blade surfaces, the common areas on the surfaces are so small as to render design of a universal clamp impracticable.

Because there is such a wide variety of key blank lengths, widths, head sizes, thicknesses, etc., a universal clamping system and key insertion detection system has conventionally been difficult to devise. There are hundreds of different key blanks available, each with differing characteristics. If the key blank is not fully inserted into a clamp, or not properly aligned with the clamp in the correct orientation, or properly gripped with the clamp on a stable part of the key blank, it will not be correctly cut. Due to the differing characteristics of the wide variety of key blanks, even trained workers regularly miscut keys using even the more complex cutting systems available.

In particular embodiments of key duplication system, a key blank receiving aperture receives a key blank held in a key blank carrier and securely holds the key blank carrier with a key blank carrier clamp while at least one key blank cutter within key duplication system housing cuts the key blank to reflect the bit pattern of a corresponding master key. This particular disclosure relates to an interaction between a key duplication system cutter and a key blank carrier. Various implementations and embodiments of key blank carriers are shown and described in co-pending application Ser. No. 13/183,982, previously incorporated herein by reference, any of which may be used with specific implementations and embodiments of key blank cutters disclosed herein. It should be understood by those of ordinary skill in the art that the principles and structures described herein are not limited to use with any particular key blank carriers or packaging and that the specific key blank carrier implementations and embodiments shown and described herein are provided as non-limiting examples to illustrate the concept of key blank carriers, and those of ordinary skill in the art will readily understand and be able to come up with other key blank carrier implementations and embodiments from the examples and principles taught herein.

A key blank carrier may be used for displaying or dispensing a key blank in addition to its use as a fixture for holding the key during the cutting process and even as key blank packaging at checkout. Whether called a carrier or packaging, its use with standard external features enables a key blank cutter to have a standard key blank receiving aperture and standard key blank carrier clamping components despite the large variations between various key blanks, enabling the key blank cutter to have a standardized key blank clamp to cut all side-cut key blanks using the same key blank clamp rather than the conventional systems which required a plurality of separate clamp units.

Figure 2A:
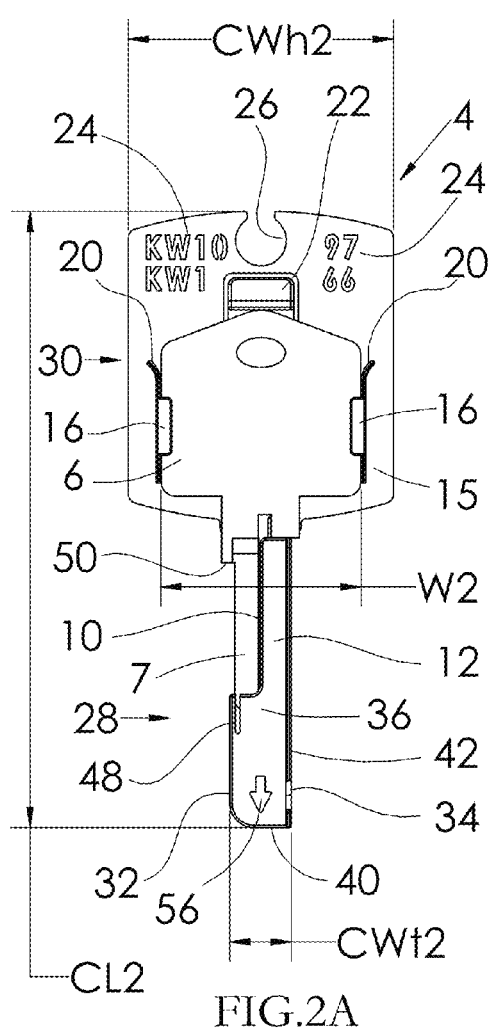
FIG. 2A, 2B are front views of key blank carriers illustrating a first set of features.
Figure 2B:
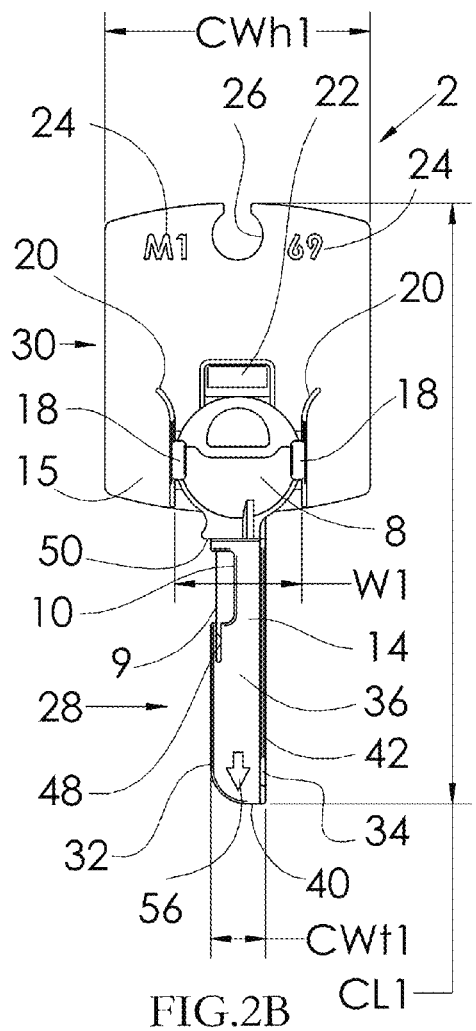

FIGS. 2A and 2B illustrate a particular implementation of a key blank carrier 2, 4, adapted to two very different key blanks 6, 8. Despite the very different key blank 6, 8 sizes and shapes, the key blank carriers 2, 4 each have common features and characteristics to enable use of the two key blank carriers 2, 4 in the same key cutter (see example of FIG. 4). In this particular implementation, the key blank carriers 2, 4 each comprise a key blank recess 10 at least partially within a key blade sleeve 12, 14.

The key blank carriers 2, 4 of FIGS. 2A and 2B each comprise a tip end 28 having a width CWt1, CWt2, and a head end 30 having a width CWh1, CWh2, and a total length CL1, CL2. The head end 30 comprises a substantially planar carrier flag 15 extends from the key blade sleeve 12, 14 toward the key blank 6, 8 head. The substantially planar carrier flag 15 comprises a key blank head channel 16, 18 adapted for the particular key blank 6, 8 intended for use in the key blank carrier 2, 4. The key blank head channels 16, 18 of the particular implementation of FIGS. 2A and 2B each have a width W1, W2 and a depth D (FIG. 4C) sized to receive the particular key blank 6, 8. Although tolerances are not required to be exact, the channels 16, 18 should be sized, in combination with the other features of the respective key blank carriers 2, 4 to contact the key blank 6, 8 heads and retain the key blanks 6, 8 into their designed carrier sufficient for holding the key blank in a desired position in relation to the key blank carrier 2, 4 for cutting in an appropriately configured cutting system. Although the key blank head channels 16, 18 of these particular embodiments illustrate a channel width W defined by two opposing channels 16, 18, each with a depth D, in particular embodiments only one channel 16, 18 may be used if the key blank 6, 8 is otherwise retained into the carrier 2, 4 sufficient for cutting. Openings to the channels 16, 18 of these embodiments comprise a flared wall 20 to assist in insertion of the respective key blanks 6, 8.

Particular embodiments may comprise a security feature, such as a retaining clip 22 positioned adjacent to the key blank head channel 16, 18. The retaining clip 22, when used, is configured to flex rearward (FIG. 3A) of the carrier flag 15 from a rest position (FIG. 3B) aligned with the carrier flag 15 so that when the key blank 6, 8 is fed into the key blank recess 10 through the key blank channel 16, 18, the retaining clip 22 flexes rearward to allow the key blank 6, 8 to pass into the key blank channel 16, 18 and return back to its rest position when the key blank 6, 8 head has passed. In a rest position, the retaining clip 22 secures the key blank 6, 8 into the key blank recess 10 when the key blank is in a fully inserted position in the recess (FIGS. 2A and 2B). Reference numbers and/or letters 24 may be included on the key blank carrier 2, 4 to indicate the key blank packaged in the carrier or the key blank for which the carrier was configured. A dispensing or display aperture 26 may be included at or near an edge of the carrier flag 15. Use of a reentrant opening aperture 26 such as that illustrated in FIGS. 2A and 2B provides particular advantage with a rigid dispensing system support developed herewith but disclosed in more detail in a separate application.

The tip end 28 of the key blank carrier 2, 4 comprises at least a portion of the key blank recess 10 embodied as a key blank sleeve 28. The key blank recess 10 comprises at least two walls 32, 34, 36, 38 (FIG. 3C) that when a key blank 6, 8 is inserted into the recess 10 contacts at least two sides of the key blank 6, 8. For the embodiments illustrated in FIGS. 2A and 2B, the key blank recess 10 embodied as a key blank sleeve 28 contacts at least two sides of the key blank 6, 8 blade. The overall key blank carrier 2, 4 comprises a depth CD. Because in many cases the carrier is designed to be disposable and/or sold with the particular key blank which it holds, and because the carrier itself does not require any additional clamps or moving parts, it can be made small. In a particular implementation, the carrier width CWh1, CWh2 is not more than 3 inches at the carrier flag, the carrier width CWt1, CWt2 is not more than ¾ inch at the sleeve, the carrier depth CD is not more than ½ inch and the carrier length CL1, CL2 is not more than 4 inches. Particular embodiments, of course, are adapted to specific key models and will be configured relative to their respective sizes. Thus, smaller key blank carriers are likely and contemplated. In a particular embodiment, a key blank carrier has a carrier width CWh1, CWh2 of approximately 2 inches at the carrier flag and a carrier width CWt1, CWt2 of approximately ½ inch at the sleeve, approximately ⅜ inch carrier depth CD and approximately a 3 inch carrier length CL1, CL2.

The key blank carrier walls 32, 34, 36, 38 each comprise a thickness of ⅜ inch or less, and in particular embodiments, a thickness of ¼ inch or less so that the key blank carrier walls 32, 34, 36, 38 do not extend a significant distance from the key blank in relation to the thickness of the key blank. The inside of the key blank recess is configured and adapted to closely hold the particular key blank 6, 8 for which the corresponding carrier 2, 4 is designed. This may be accomplished in many different ways, but one particular way is to include one or more ridges 35 in at least a portion of the key blank carrier sleeve 12 to mate with a keyway (groove in the key blade) of the key blank. Although it is not necessary to match the shape of the particular key blank 6, 8, it is desirable in particular embodiments to snugly hold the particular key blank 6, 8 so that the particular key blank 6, 8 does not freely move within the recess. The carrier 2, 4 ultimately is inserted into a key cutter adapted to engage the carrier 2, 4 which positions the key blank blade for accurate cutting by the key blank cutter. If the key blank 6, 8 is not positionally secured within the carrier 2, 4 when the carrier 2, 4 is inserted into the key blank cutter, the key blank may not be accurately positioned by the key blank carrier 2, 4 or accurately cut by the key blank cutter. In other particular implementations, the key blank recess may comprise the key head channel with or without a key blade sleeve. The key blank carrier 2, 4 may be a disposable plastic carrier which is used for one or more of displaying the key blank on a display or in a vending system, dispensing the key blank from a vending system, verifying that the selected key blank is correctly selected, positioning and holding the key blank in the key blank cutter, and bearing the check-out code 52 (such as a bar code or alphanumeric code) (FIG. 3D) with which the user can pay for the key blank.

In particular implementations of a key vending system, the vending system may dispense a separate key blank carrier that is not mated with the key blank when dispensing the key blank. The user may be instructed to insert the key blank into the carrier before inserting the carrier and key blank into a key blank cutter. A key blank carrier, whether dispensed separately or previously incorporated with the key blank, may comprise a sleeve and/or a head cap or other alignment fixture that removably couples to the key blank. In particular implementations, ridges on an inside surface of the key blank carrier may be positioned and configured to engage grooves on the key blade to more securely hold the key blank within the carrier.

In particular embodiments of a key blank carrier comprising a blade sleeve 10, a portion of the walls 32, 34, 36, 38 may be removed or recessed to expose all or a portion of the key blade for cutting through an aperture in a carrier wall, which aperture may be configured as a recess on a side of at least one of the carrier walls as illustrated in FIGS. 2A, 2B. In other particular embodiments, however, the key blade may not be exposed and the key may be cut through the carrier 2, 4. The walls 32, 34, 36 and 38 of the embodiment of FIGS. 2A, 2B and 3C comprise a key blade bit side wall 32 (corresponding to a side of the key blank blade into which the key bit pattern is cut), key blade spine side wall 34 (corresponding to a side of the key blank blade called the spine), a front side wall 36 and a back side wall 38. In the embodiment of FIGS. 2A and 2B, the portion of at least the front and bit sides is missing or recessed between the head end 30 and a distal end 40 of the tip end 28 that exposes a majority of a bit edge 7, 9 of the key blank 6, 8 when the key blank 6, 8 is in its fully inserted position in the key blank carrier 2, 4 (FIGS. 2A and 2B).

Standard carrier features and characteristics may be included on a plurality of carriers designed for a variety of key blank makes and models. For example, although the characteristics of the key blank recess will be different for different key blanks to receive and hold the key blanks, external characteristics of the carriers may be made the same so that the carriers all interact with a standard key blank cutter aperture to receive and position the key blank blades of all key blanks within an appropriately configured carrier in a correct location in relation to a cutting wheel of the cutter. Variations in key blanks require that for an accurate cut, the key blank must be positioned accurately within a three-dimensional space adjacent to the cutting wheel. By adapting relative carrier dimensions, all key blanks may be accurately positioned by a corresponding appropriately configured carrier in a key blank cutter. There are many variations possible for each key blank make and model depending upon the particular key blank cutter and key blank cutter aperture used. The examples provided in this disclosure are intended to be representative for purposes of communicating the idea but not limiting as to the limits of the possible variations. Those of ordinary skill in the art will readily understand from this disclosure the appropriate adjustments to be made for particular embodiments given the various parameters of a particular system and key blank.

Figure 3A:
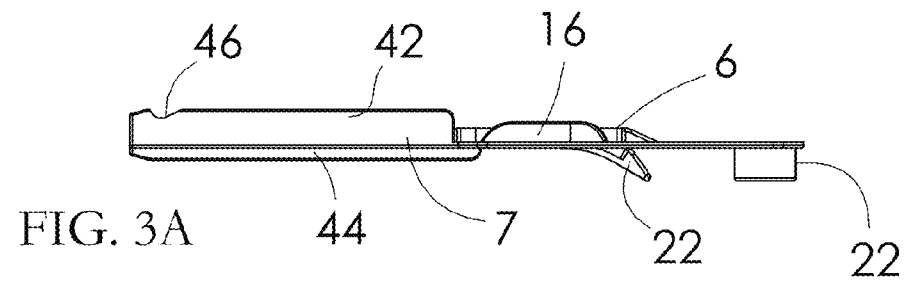
FIG. 3A, 3B, 3C, 3D are different views of a key blank carrier.
Figure 3B:
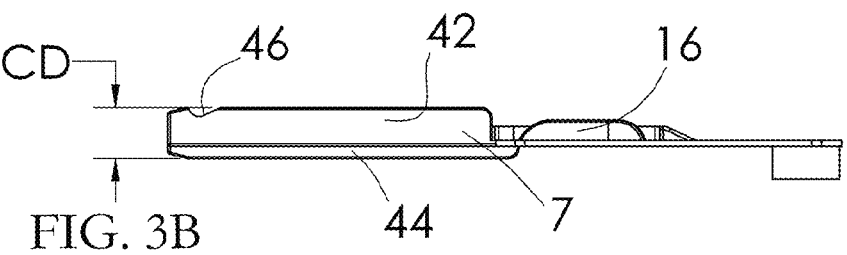
Figure 3C:
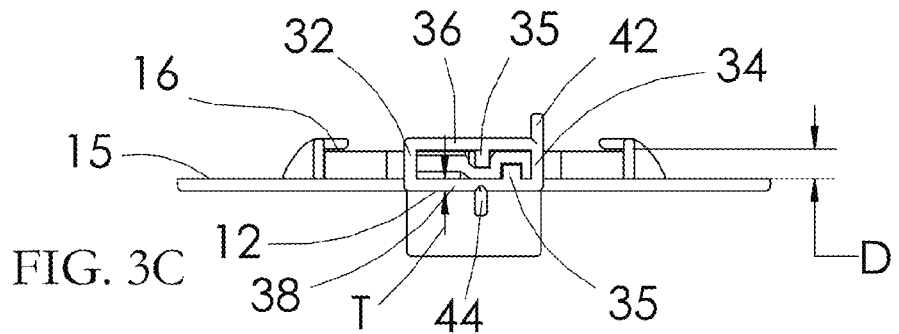

In a particular key blank carrier embodiment, the key blank recess may be positioned more toward the spine side 34 or to the bit side 32, more toward the front side 36 or toward the back side 38 (in any implementation or embodiment, whether configured as a key blank blade sleeve or simply as a key head recess), and may be positioned more toward the distal end 40 or toward the head end 30 of the carrier (relationally speaking to enable the key blade to be positioned farther or less into the cutter). On an outer surface of the carrier 2, 4, a key blank cutter alignment feature may be included. Although the embodiments of FIGS. 3A, 3B and 3C illustrate ridges 42, 44, other key blank cutter alignment features may be used such as, by non-limiting example, ridges, grooves, shaped cutter cross-sections, clips and the like to mate with a correspondingly shaped portion of the key blank cutter aperture to properly align the key blank carrier within the cutter for accurately cutting the particular key blank for which the key blank carrier was designed.

A particular implementation of an alignment feature may comprise a first ridge 42 on an outer surface of the sleeve 12, 14 extending lengthwise along a portion of the sleeve 12, 14. In the particular embodiment of FIGS. 3A, 3B and 3C, the first ridge 42 extends along a border of the key blade sleeve 12, 14 adjacent the key blank spine side 34. Inclusion of the ridge along the border adjacent the spine side 34 allows for stable support for the ridge 42 while allowing the front side 36 of the sleeve 12, 14 to flex enough for a key blank clamp of a key blank cutting system to clamp the key blank carrier 2, 4 with sufficient force to flex the carrier 2, 4 outer surface of the sleeve 12, 14 toward the key blank 6, 8, causing the sleeve 12, 14 to more securely grip the key blank 6, 8 within the sleeve 12, 14 through the carrier 2, 4 prior to cutting. Other embodiments may include a ridge in other locations on the sleeve 12, 14 or head flag 15.

Inclusion of a ridge 42 on the front side 36 and/or back side 38 of the key blade sleeve 12, 14 or other key blank carrier implementation creates an asymmetrical cross-sectional shape for the portion of the carrier that is inserted into the key blank cutter. An example can be seen in FIG. 3C, which shows an end view of the tip end of a key blank cutter configured as a key blade sleeve that inserts into a key blank cutter, such as through the entry port 114 of the implementation of FIG. 7A. The end view of the tip end 28 for particular embodiments may be made unique enough to allow insertion of the tip end 28 in only one orientation, that unique shape being asymmetrical for all but not more than one cross-section of the shape. Having a shape that is asymmetrical for all but not more than one cross-section of the shape ensures that the insertion orientation of the key blank carrier is always known.

For a single-side cut key, the key blank bit side should be properly oriented in a key blank cutter so that the key blank bit side is oriented toward the cutting wheel. If it is improperly oriented, the key blank spine side will be cut. For double-side cut keys, such as some automobile keys for example, both sides of the key may be cut with mirrored patterns. In this case, it is not important to cutting the key blank whether a first or a second key blade edge is facing the cutting wheel, but only that it is correctly positioned within the key blank cutter aperture in relation to the cutting wheel and oriented correctly in relation to the wheel with the first or second key blade edge facing the wheel. Nevertheless, it may be important which edge of the key blank carrier is facing up or down for implementations involving an identifying bar code sticker (FIG. 3D), to permit the bar code to be scanned. In particular embodiments, such as that illustrated in FIG. 3C, a second ridge 44 may be included on a second side, such as the back side 38, of the sleeve 12, 14 to further assist in alignment.

In particular embodiments of the implementation illustrated in FIGS. 2A and 2B, an aperture or slit 48 may be included in a front 36 or back 38 side of the sleeve 12, 14. In the particular embodiments illustrated in FIGS. 2A and 2B, the slit 48 is included along a border of the bit side 32 of the carrier 2, 4 sleeve 12, 14. Addition of the slit 48 immediately adjacent to the bit side 32 of the sleeve 12, 14 provides two key advantages. First, the slit allows the front side 36 of the sleeve 12, 14 to be less rigid and to flex when a key blank cutter clamp presses against the outer surface of the sleeve 12, 14. This further enables secure holding of the key blank in the cutter during cutting of the key blank 6, 8. Second, the slit 48 positioned immediately adjacent to the bit side 32 of the sleeve 12 permits the bit side 32 of the sleeve 12 to flex outward slightly away from the bit edge of the key blank blade when a key blank 6, 8 is inserted into the sleeve 12. By making an internal dimension of the sleeve 12 slightly less or exactly the same as the key blank 6 for which the sleeve 12 is designed, ignoring tolerance variations, the key blank 6 bit edge can contact the bit side wall 32. Even if manufacturing tolerances are off for the particular key blank 6 or the carrier 4, the carrier 4 can adjust to the width of the key blade and still cause the carrier to press the key blade against the spine side wall 34 of the sleeve 12.

In some implementations, the distal end 40 of the carrier 2, 4, may be made a known length from where a shoulder 50 of the key blank 6, 8 will sit in the carrier 2, 4 for the particular key blank 6, 8 so that the key blank cutter can sense that the key blank has been fully inserted into the cutter and is ready to be clamped for cutting. In some embodiments, such as those illustrated in FIGS. 2A and 2B, the known length may be longer than the key blade for the particular key blank for which the carrier 2, 4 is designed. By establishing the relative dimensions of the carrier 2, 4 in relation to the particular key blank for which the carrier 2, 4 is designed, the relative positioning of the key blank shoulder 50 can be accurately known for accurate positioning in the cutter and accurate key blank cutting of the key bit pattern in relation to the key blank shoulder 50.

In particular embodiments, a leading edge of the ridge 42 may be tapered toward the outer surface of the sleeve 12, 14 as the ridge 42 nears the distal end 40 of the key sleeve 12, 14. Tapering toward the outer surface allows the shape of the end view of the sleeve 12, 14 to more easily insert into a mating shape on the key cutter. Additionally, in particular embodiments, a divot 46 (FIGS. 3B and 3C) may be included in one or more ridges 42, 44 on the key sleeve 12, 14. Inclusion of a divot 46 allows for a reference point on the key sleeve that can be used by a key blank cutter to engage the key blank carrier 2, 4 (see FIG. 5D and related discussion). For the rounded divot illustrated in FIGS. 3B and 3C, the divot 46 in the carrier 2, 4 is positioned to engage a spring biased clip in the cutter when a user inserts the carrier 2, 4 into the cutter and gives the user a tactile response to know that the carrier 2, 4 is fully inserted. Although the example illustrated in FIGS. 2B and 2C include the divot 46 in one or more ridges 42, 44, a similarly functioning reference point on the carrier 2, 4 may be made at other places on the carrier 2, 4 in other embodiments and implementations. In other particular implementations, the distal end 40 of the sleeve 12, 14 may have one or more tapered outer surfaces to simplify insertion of the sleeve 12, 14 into an aperture on the key blank cutter.

Particular implementations of a carrier, such as that illustrated in FIGS. 2A and 2B, may comprise a reference indicator on the carrier 2, 4 indicating to the user which side is up and in which direction the user should insert the carrier 2, 4 into a key blank cutter. In particular embodiments, the reference indicator 56 may comprise an arrow placed on the sleeve 12, 14. In more particular embodiments, the reference indicator 56 may be an aperture through the front side wall 36 of the sleeve. Although other physical attributes of the key blank carrier may be configured to physically require the key blank to be inserted in a particular orientation, a visual indicator that is physically part of the key blank carrier, not just a sticker adhered to the carrier that may fall off, may help the user in using the key cutting system. Whether used as an indication to the user or not, a reference indicator such as an aperture through a wall of the sleeve 12, 14 or other reference indicator on the carrier 2, 4 may be included on the carrier 2, 4 that functions as a reference point for the key blank cutter to ensure the key blank carrier 2, 4 is fully inserted into the key blank cutter. This may be confirmed through the portion of the key blank carrier 2, 4 in many different ways, such as, without limitation, engaging a switch within the cutter, blocking a light beam, or allowing a light beam.

Figure 3D:
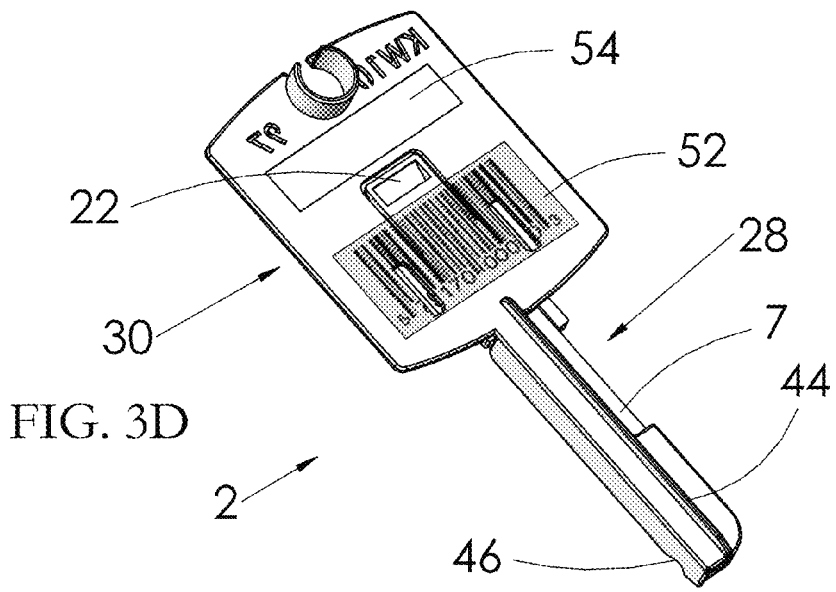

Particular implementations of a carrier, such as that illustrated by FIG. 3D, may further comprise one or more bar code stickers 52 and/or other machine readable identifier, such as a radio frequency identification (RFID) tag 54 on the carrier, to assist in inventory tracking, security, product verification and checkout. For example, inclusion of a bar code sticker 52 on a back surface of the carrier 2, 4 of FIG. 3A or 3B over the retaining clip 22 may be used to restrict flexing of the retaining clip to further restrict key blank removal from the carrier 2 without damaging the sticker 52. The bar code on the sticker 52 may also be used by the key blank cutter to confirm that the particular key blank being cut is an appropriate key blank for the master key identified by the system. The bar code on the sticker 52 may also be used for product checkout at a cash register to allow the user to pay for the duplicate key after it is cut. An RFID tag 54 may be used for any of these uses as well, but also has an advantage of being trackable from a distance. Particular implementations comprise an RFID tag on or in the carrier, and in particular embodiments, the RFID tag is included on or in the key sleeve.

As will be clear to those of skill in the art, the various features illustrated in reference to the various embodiments and implementations, even if not specifically discussed with reference to a particular embodiment or implementation may be included in any embodiment or implementation depending upon the needs of a particular application of the technology. The differing examples provided herein are not intended to be limiting of particular features to particular examples.

Figure 4:
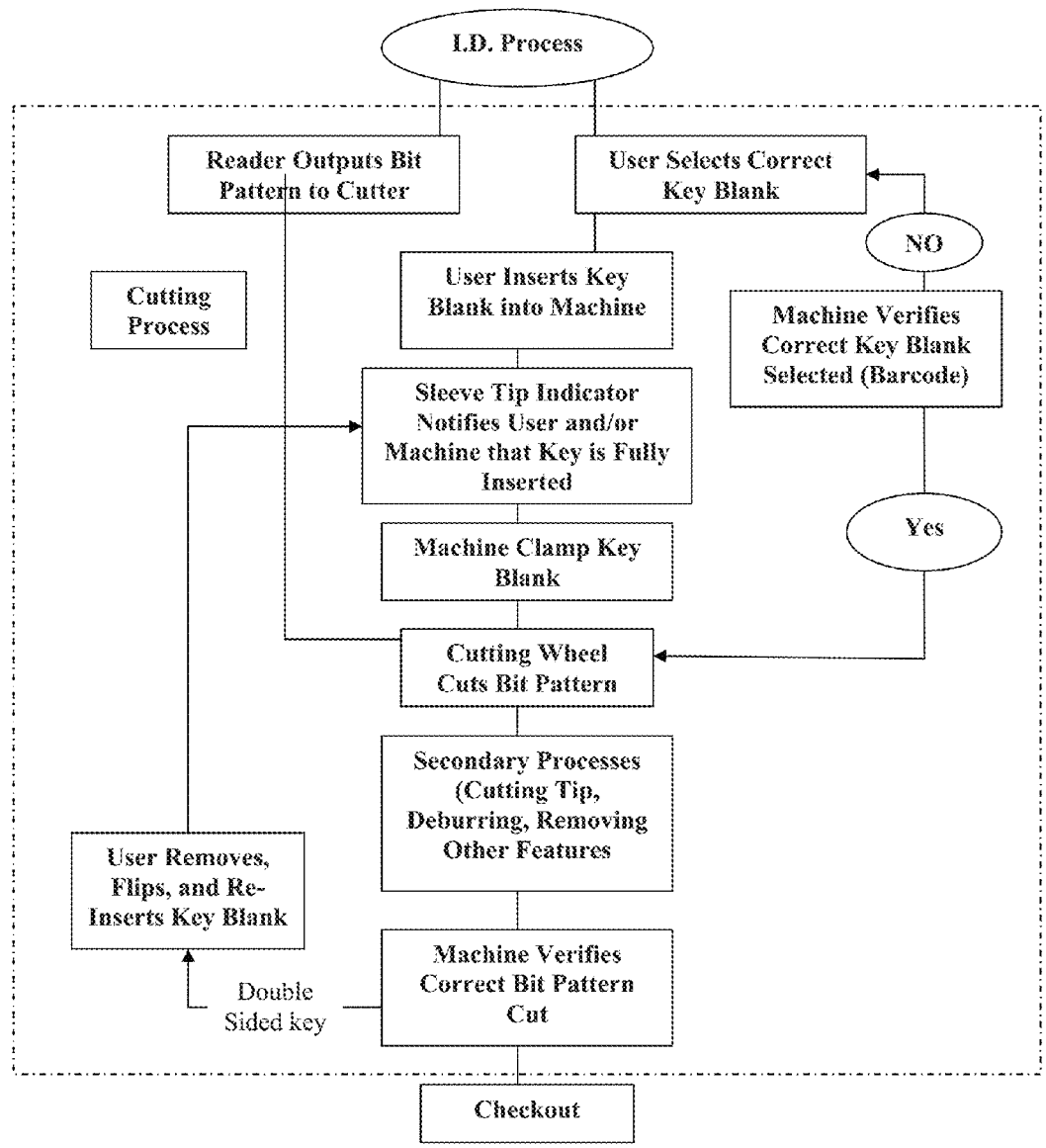
FIG. 4 is a block diagram of a key blank cutting process.

FIG. 4 illustrates an example of a detailed cutting process. In FIG. 4, a bit pattern reading device outputs the master key bit pattern to the key blank cutter. The reading device may send the bit pattern to the cutting portion through electrical signals, mechanical movements, or other information transfer methods. The identification process may output the key blank type to the user, may simply dispense a correctly configured key blank, may allow the user to select from a variety of correctly configured key blanks to match the identified master key, or may even automatically convey the appropriate key blank to the cutter for cutting prior to dispensing the duplicate key to the user. Particular embodiments of the output may be in the form of a color code, an alphanumeric code, or other identifiable method so the user may select the correct key blank from the matching code on the carrier. In a particular implementation, the key blanks may be stored in a rack or dispensing system. The user may select the key blank and then insert the key blank into the system. Whether by the user or automatically by the key duplication system, upon insertion of the key blank and carrier into the key cutter, a reference indicator, such as on a key blade sleeve tip or key blade head clip may indicate that the key blank and carrier are fully inserted into the cutter.

At any point of the cutting process, the key blank may be verified to ensure that the correct key blank was selected. The verification step may occur prior, during, or after insertion into the cutter. The step may occur automatically or the user may be prompted to complete this step. Particular embodiments may include a prompting to the user to scan the key sleeve in a barcode reader or the system automatically reading the key bar code or RFID tag code upon insertion by the user. If the key blank is wrong, the system may prompt the user to select the correct key, disable the machining capabilities of the system, or by another method inhibit the equivocal duplication of a key blank. The cutting portion of the key may clamp the key and the cutting wheel duplicates the bit pattern into the blade of the key blank. If the key is a double sided key, the system may automatically flip the key, prompt the user to turn the key At any point of the cutting process, the key blank may be verified to ensure that the correct key blank was selected. The verification step may occur prior, during, or after insertion into the cutter. The step may occur automatically or the user may be prompted to complete this step. Particular embodiments may include a prompting to the user to scan the key sleeve in a barcode reader or the system automatically reading the key bar code or RFID tag code upon insertion by the user. If the key blank is wrong, the machine may prompt the user to select the correct key, disable the machining capabilities of the machine, or by another method inhibit the equivocal duplication of a key blank. The cutting portion of the key may clamp the key and the cutting wheel duplicates the bit pattern into the blade of the key blank. If the key is a double sided key, the machine may automatically flip the key, prompt the user to turn the key over, or by another method cut two sides of the key.

Figure 5A:
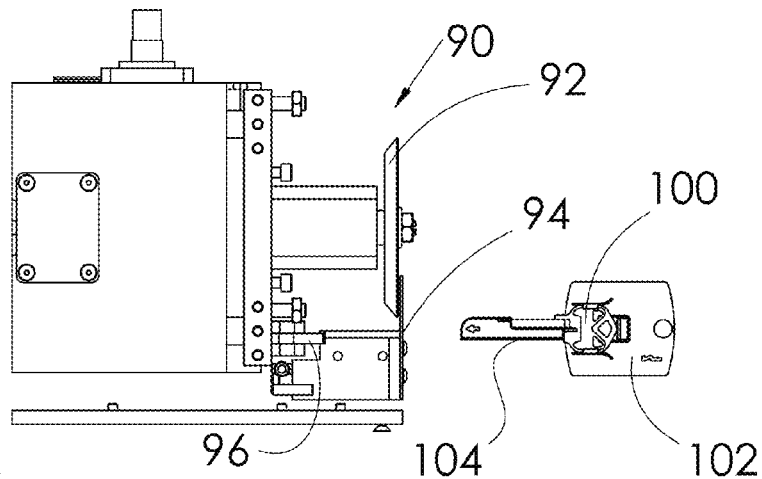
FIGS. 5A, 5B, 5C, 5D, 5E are various cut-away views of a key blank cutter during a key blank cutting process, with a portion of the housing removed.
Figure 5B:
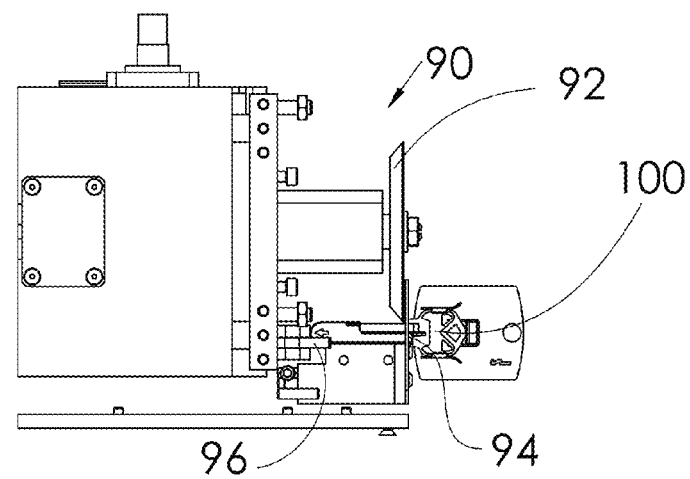
Figure 5C:
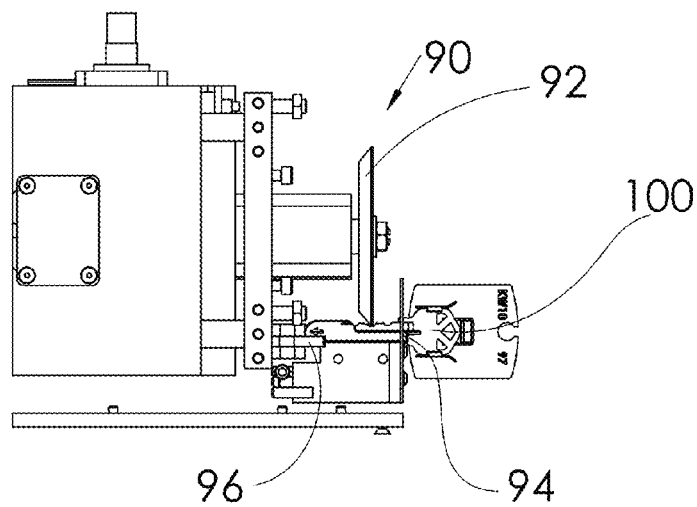
Figure 5D:
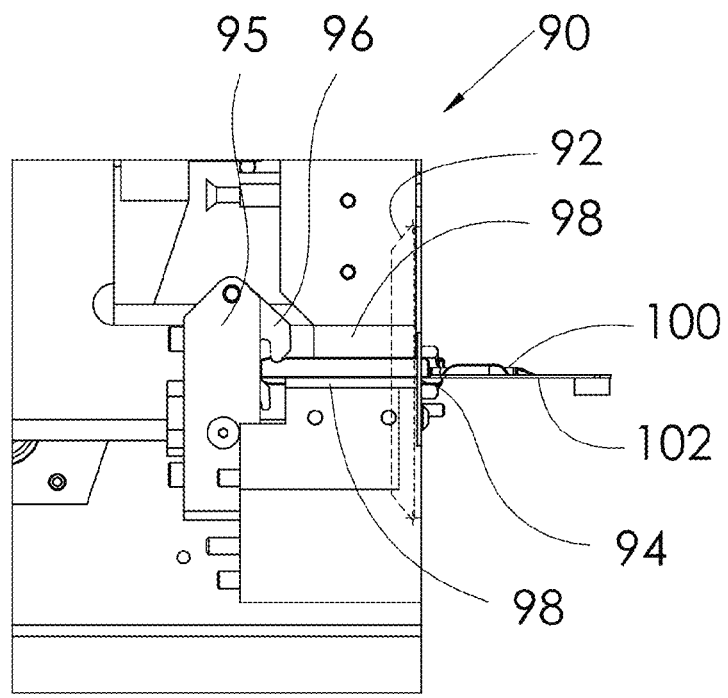
Figure 5E:
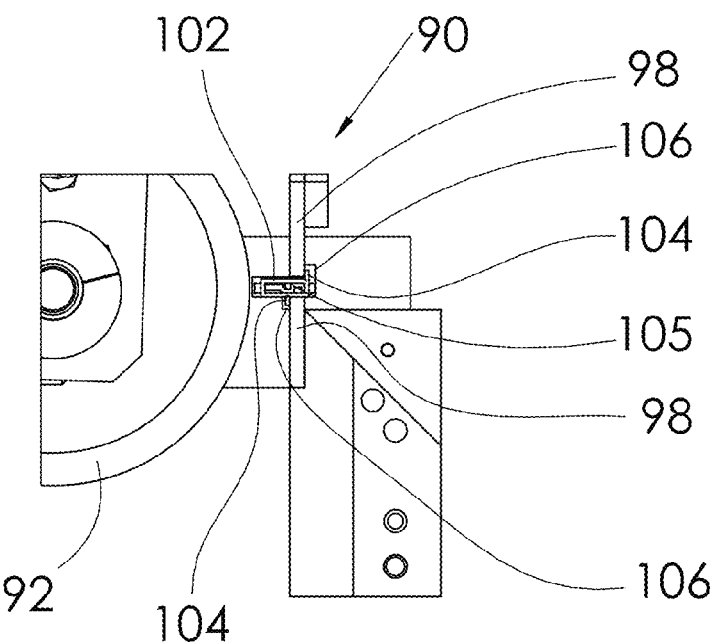

The following is an abbreviated description of an example of a key cutting operation using a key carrier. FIGS. 5A-5E illustrate various cut away views of an example of a key blank cutter 90 with a cutting wheel 92 and a portion of the housing removed to show the key blank cutter 90 adapted for cutting a key blank 100 in a key blank carrier 102 embodied as a key sleeve. FIGS. 5A-5C illustrate a top down cross-sectional view of the cutter 90 with the key blank 100 in its carrier 102. FIG. 6A illustrates the key blank 100 in its carrier upon removal from the cutter 90. The cutting wheel 92 may be disengaged and the key entry 94 opened prior to insertion of the carrier 102. One or more alignment features 104 on the carrier 102 and a tip end view shape of the carrier 102 (see FIG. 5E) ensure that the key blank 100 is properly positioned within the cutter 90 in relation to the cutting wheel 92 including that the key blade bit edge is facing toward the cutting wheel 92 (FIG. 5B). When the key blank carrier 102 of this embodiment is fully inserted, a carrier tip sensor 96 senses that the carrier 102 is fully inserted and the carrier 102 and key blank 100 are clamped in place. After one or more carrier 102 and/or key blank clamps 98 (FIG. 5D) are engaged, the cutting wheel 92 contacts the key blade (see FIG. 5C) to duplicate the appropriate bit pattern as determined by the identification process. FIG. 5D illustrates a side cross-sectional view of the embodiment of FIG. 5A, illustrating clamps extending along a length of the key blank 100 blade. In the embodiment illustrated, the tip sensor 96 is embodied as a hook shaped cam that interfaces with a sensor contained in the cam housing 95 and a divot 106 in the key blank carrier. The one or more clamps press at least a portion of the key blank blade, and thereby may immobilize the key blank during cutting. FIG. 5E illustrates a cross-sectional sleeve distal end view of the clamp 98 and key blank blade 105 which is orthogonal to the view of FIG. 5D. In this view, the one or more alignment features 104 on the carrier 102 are shown to interface with corresponding features 106 on the blank receiving aperture and in this embodiment even with the one or more clamps 98 themselves. Interface between the one or more alignment features 104 and corresponding features on the one or more clamps 98 themselves further provides stability for the key blank 100 and its carrier 102 during cutting. The one or more clamps 98 may or may not directly contact the key blank blade 105 during the cutting process and may clamp the key blank 100 through the carrier 102 or through a combination of direct contact with the key blank 100 and through the carrier 102.

In particular implementations, after any portion of the cutting process, one or more secondary processes may be employed to further prepare the key for use, such as removing extra features from the key such as extended tips, knobs, or ridges. The key may also be deburred by passing the cutting wheel across the key bits a second time to clean them up and smooth them out. At any point after cutting the key bit pattern into the key blank 100, the key duplication system may have a verification method for determining if the now duplicated key matches the master key. The verification may occur within the cutting area of the cutter, or in a separate location. The key may also be cut with a constant speed motor cutting blade, wherein the blade rotates at a constant speed cutter wherein the cutter maintains its speed while cutting a key blank. The constant speed cutter may reduce the noise resulting from the cutting.

FIGS. 7A-7D illustrate a particular implementation of a key blank receiving aperture 114 comprising a plurality of angled surfaces 112 adjacent to the key blank receiving aperture to form an entry port 110. The plurality of the angled surfaces 112 each angled away from the receiving aperture 114 to form a tapered entry port between a user and the key carrier receiving aperture 114. In a non-limiting example, the angled surfaces 112 adjacent to the key entry port may be tapered to assist a user with the key insertion and to guide the key blank carrier 126 more smoothly into the key blank receiving aperture 114. To accommodate key carriers with larger key carrier flags 128, two of the angled surfaces 116, 118 on opposing sides of the entry port 110 may further each comprise a retractable wall 120, 122 positioned symmetrically across from each other such that the retractable walls 120, 122 retract away from the customer when they are pushed in by the carrier flag 128 when the key blank carrier 126 is inserted into the receiving aperture 114, and provide a single pathway to the key blank receiving aperture 114. The retractable walls 120, 122 may be biased, such as through a spring, to remain in position, aligned with the the angled surfaces 116, 118 (FIGS. 7A and 7B) to guide the tip of the key carrier 126 toward the key receiving aperture 114. When the carrier flag 128 (FIG. 7B) contacts the retractable walls 120, 122, it pushes them out of the way to allow the carrier flag 128, or any other larger portion that may be included in a particular key blank carrier implementation, to pass beyond the surface of the angled surfaces 116, 118 (FIG. 7C) so that the key blank carrier 126 and corresponding key blank can be more fully inserted into the key cutter. When the key blank carrier 126 is removed from the key receiving aperture, the retractable walls 120, 122 return to their original position through a bias. The angled surfaces 112 and the retractable walls 120, 122 of the entry port 110 may be configured to only allow for frontal insertion of a key blank carrier 126 into the key blank receiving aperture 114. In addition, the perimeter 113 of the key entry port, which may be formed in a face plate 115 or out of several adjacent but separate parts, corresponds to the shape of the outer surface of the key blank carrier may be configured to only permit the key blank carrier to be inserted in one direction despite a user's effort to insert the key blank carrier in an inappropriate direction in relation to the key blank cutter.

Figure 7A:
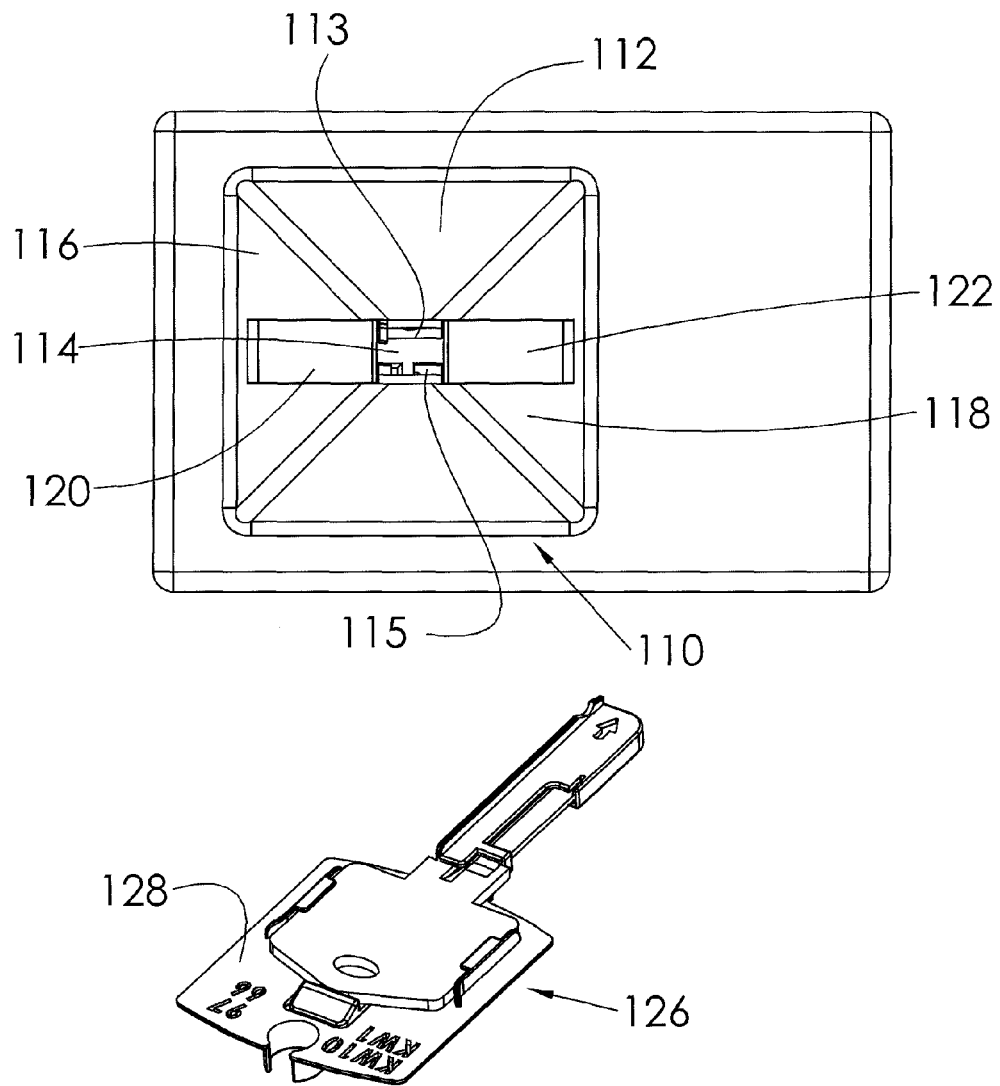
FIGS. 7A, 7B, 7C and 7D illustrate implementations of a key blank carrier being inserted into a key blank receiver.
Figure 7B:
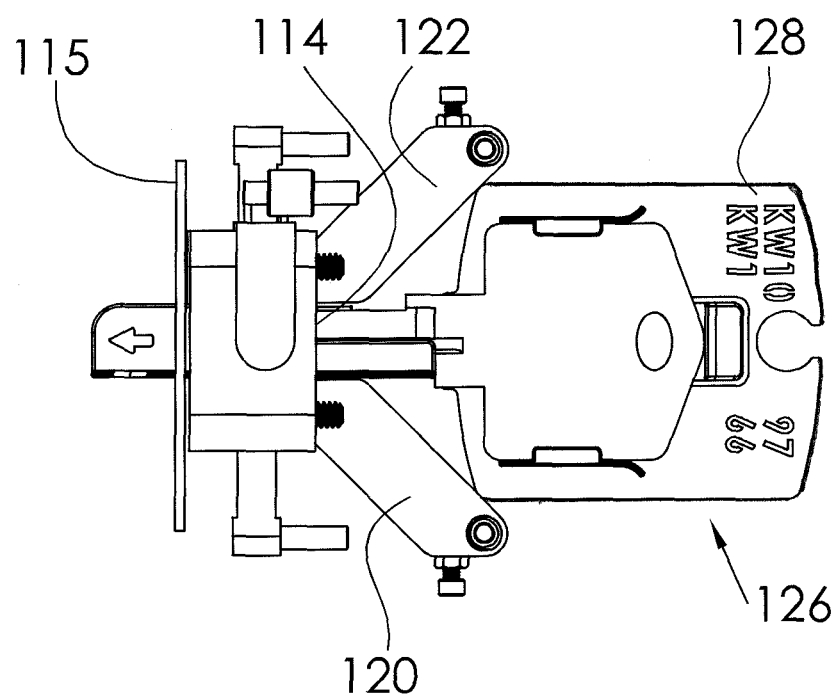
Figure 7C:
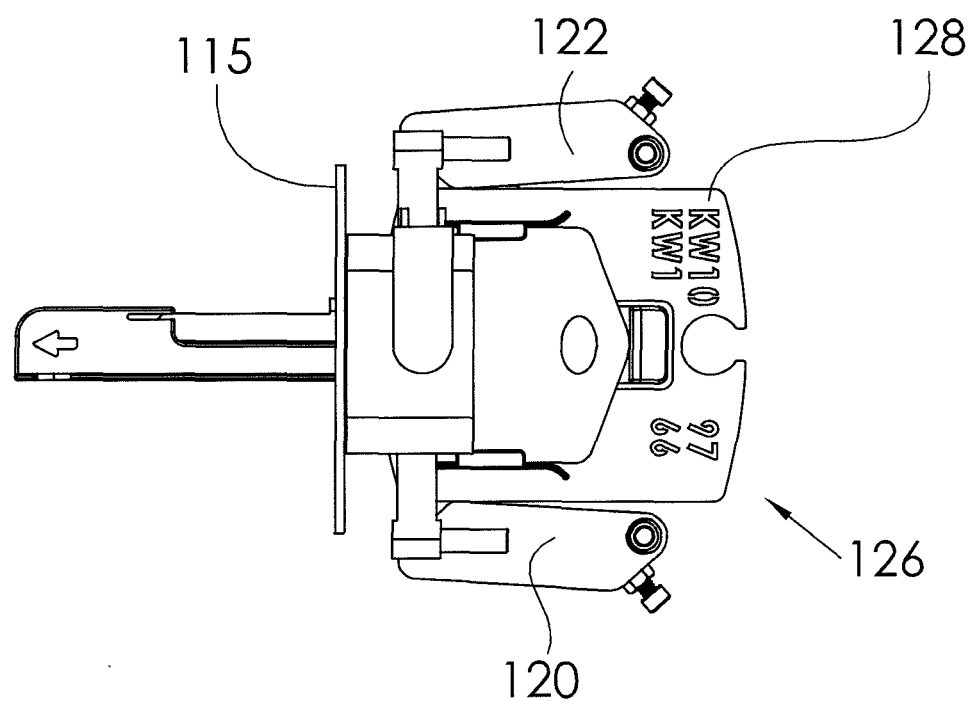
Figure 7D:
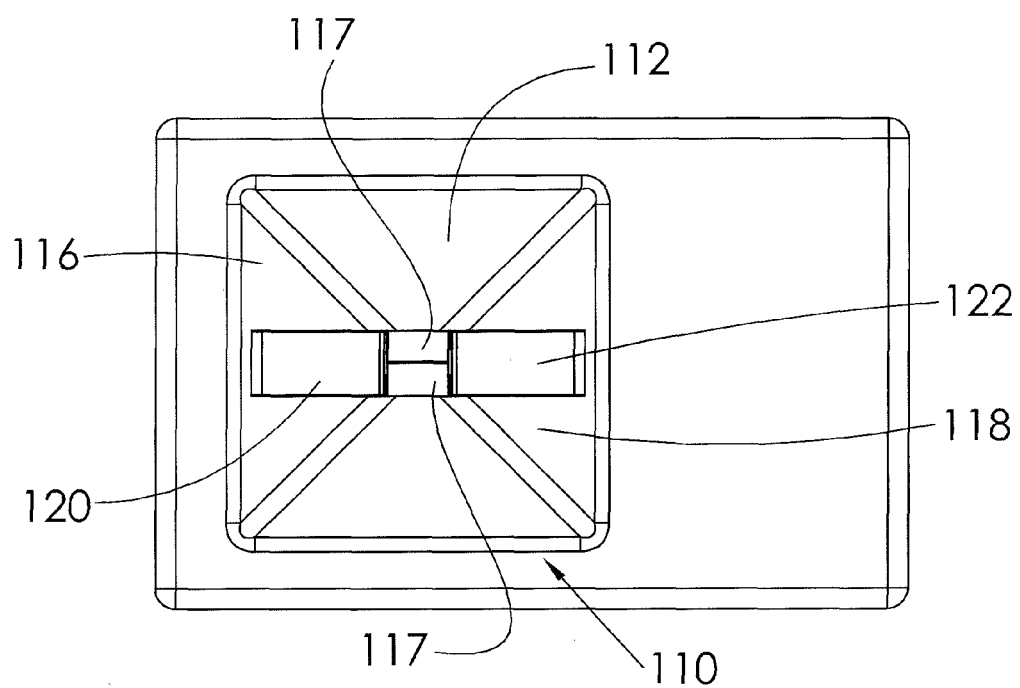

In particular implementations of a key receiving aperture, the key receiving aperture 114 may further comprise at least one movable guard 117 positioned adjacent to the key receiving aperture. In a non-limiting example, the at least one movable guard 115 may be configured to close adjacent to the blank receiving aperture 114 when the key entry port is not in use (FIG. 7D). The at least one movable guard however, may be configured to retract from its position and open up the key blank receiving aperture 114 when in use (FIG. 7A). Use of one or more movable guards can restrict customers from inserting objects into the key blank receiving aperture 114 at times other than when the key blank cutter is in use. In particular implementations of a key blank receiving aperture, one or more movable guards may also be utilized to restrict the movement of a key blank carrier once the key carrier sleeve is fully inserted within the key duplication housing. In particular implementation of a key blank receiving aperture, two movable guards are slidably positioned within at least one slot adjacent to the key blank receiving aperture and are configured to extend and contract in relation to the key blank receiving aperture and to contact at least a portion of the key blank carrier or the key blank after a key blank is inserted into the key blank receiving aperture 114 to assist in securing or temporarily holding the key blank in place prior to cutting. In some particular implementations, one or more guards may also be used to secure the key blank during cutting.

Figure 8A:
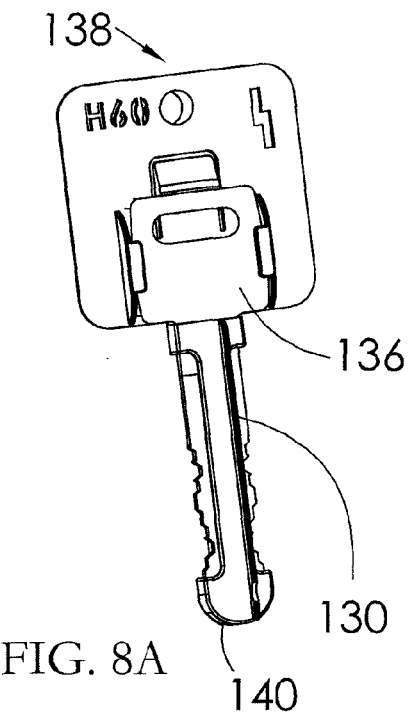
FIGS. 8A, 8B, 8C illustrate alignment features of a key blank carrier.
Figure 8B:
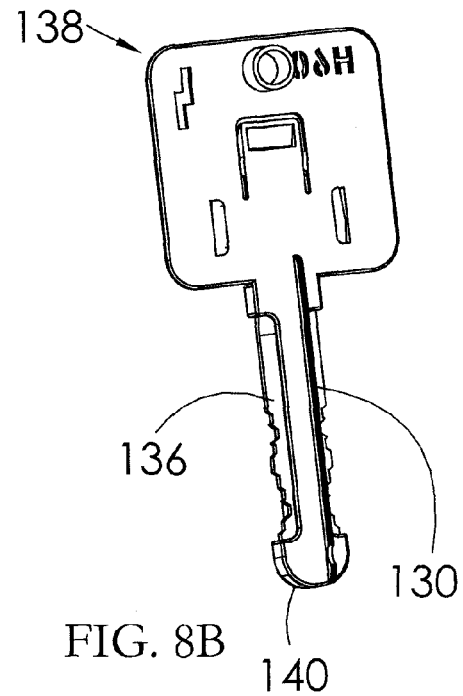
Figure 8C:
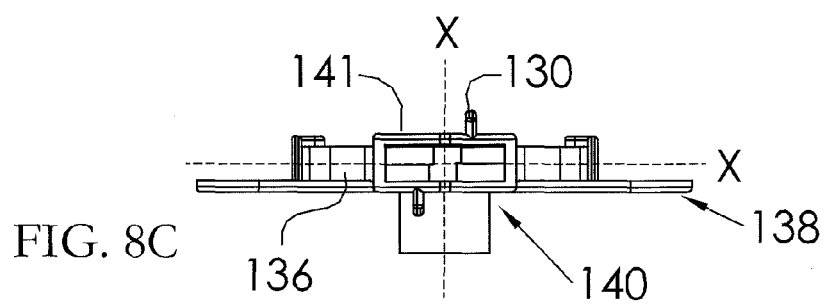
Figure 8D:
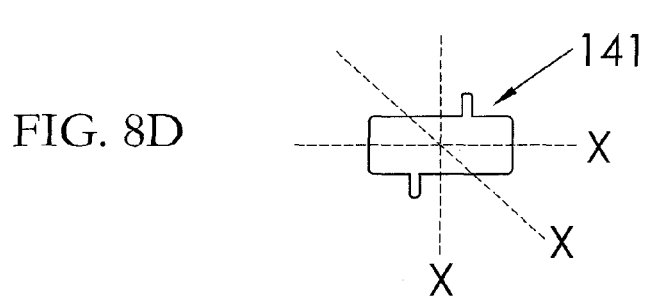
FIG. 8D illustrates an outer shape of an end of a key blank carrier.

FIGS. 8A and 8B illustrate front and back perspective views of a key blank carrier 138 for a double-sided key 136. The key blank carrier 138 includes a tapered distal end 140 and appropriately configured and positioned alignment features 130. FIG. 8C illustrates a distal tip end view of the key blank carrier of the embodiment of FIGS. 8A and 8B. Note that, like previous implementations of single-sided key blank carriers, an end view of the walls of the sleeve in combination with the key blank alignment features 130 form an outer shape 141 (FIG. 8D) of the key blank carrier 138 around a portion that would be inserted into a key blank cutter that is asymmetrical about all but not more than one cross-sectional axis (see FIG. 8C). One of ordinary skill in the art will readily be able to configure an appropriately shaped key blank receiving aperture adapted to receive the cross-sectional key blade carrier shape of the key blade carrier illustrated in FIG. 8C. With a double-sided key blank, because it is cut symmetrically on both sides of the key blade, in particular implementations it may not be important whether a particular edge of the key blade is inserted facing toward a first side or another. If they key cutter has only a single key cutting wheel (or other key cutting implement), a first side of the key blade can be cut first, the key rotated 180 degrees, and the second side of the key blade can be cut second.

In particular implementations, a key blank receiving aperture, in combination with one or more guards, may be adapted to generate a dynamic perimeter shape customized to the particular key blank carrier to be inserted, or to the particular key blank to be inserted (for implementations with or without a key blank carrier). By moving one or more guards into place at the key blank receiving aperture, the system can ensure that the perimeter of the cross-sectional shape of the key blank and/or carrier of a particular key blank that the system is expecting to be inserted is matched to restrict unexpected key blanks from being inserted. By knowing that the expected key blank is inserted, the system can further reduce miscuts and increase customer satisfaction.

Figure 9:
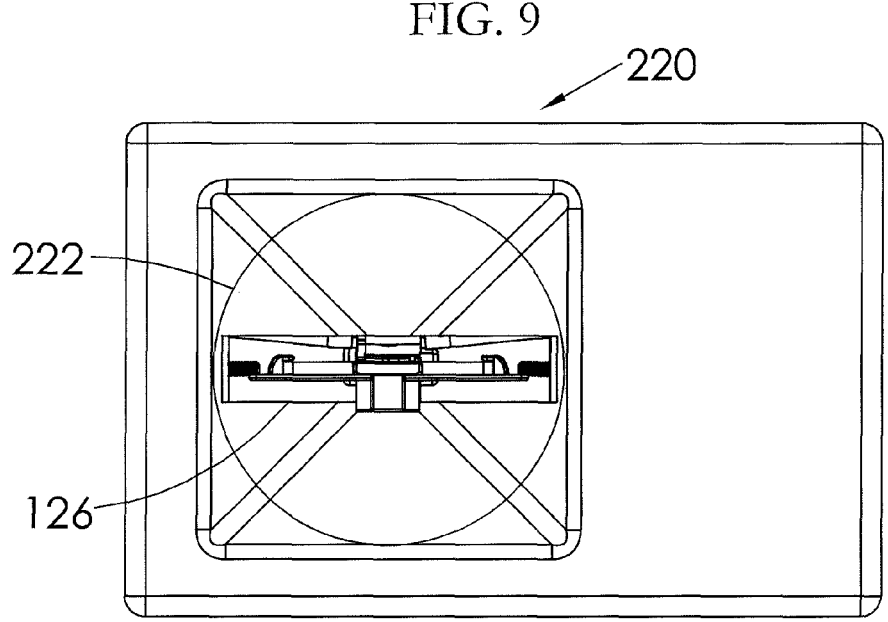
FIG. 9 illustrates a pivotal axial support for a key blank receiving aperture adapted to enable a two sided key blank to be rotated along its axis without having to be removed from the key blank receiving aperture.

FIG. 9 illustrates a particular implementation of an axially pivotable key blank receiving aperture unit 220 similar to the fixed key blank receiving aperture illustrated in FIGS. 7A-7D, but with the further feature of the key blank receiving aperture portion 222 that receives the key blank 126 being pivotable around the center axis of the key blank blade and/or carrier for key cutting systems which use only one key cutter. For a double cut key in a key cutting system using only one key cutting mechanism, such as a key blade cutting wheel or a stamp cutter, once the first side of the key blank is cut, the key needs to be rotated 180 degrees to allow the second side of the key blank blade to face the key cutting mechanism, or the key cutting mechanism needs to be moved to the other side of the key blank blade. In particular implementations, the key blank may be removed from the key blank receiving aperture, rotated 180 degrees and then reinserted into the key blank receiving aperture. In other implementations, such as that illustrated in FIG. 9, the key blank receiving aperture and surrounding mechanisms may be configured with appropriate bearings and/or other rotational supports to allow the key blank receiving aperture holding the key blank to be rotated 180 degrees. This may be automated for control by a processor controlling the system, or manually by the user turning the key similar to turning a key in a lock, or through other automation associated with the key cutting system turning the key. In particular implementations, the rotation may continue to the 180 degree point until a pivotal support latches in the 180 degree position, ready for cutting the second side of the blade. However the rotation is accomplished, in particular implementations the key blank receiving aperture and associated components that were rotated may be associated with a pivotal support that is biased to its original rest position so that after the cutting process is completed, the pivotal support returns the rotated components to their original position automatically through spring or other bias.

Figure 11:
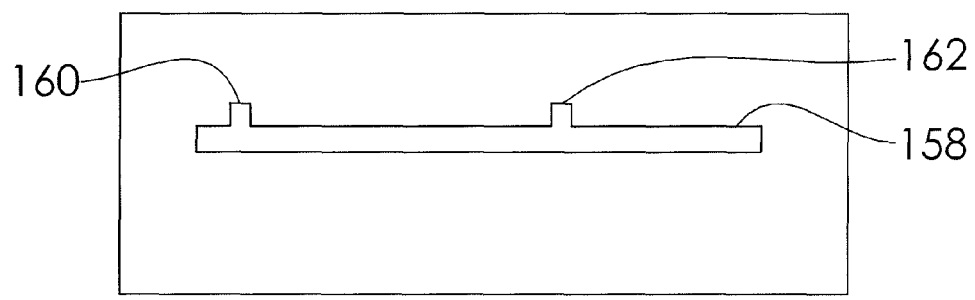
FIG. 11 illustrates a frontal view of a key carrier receiving entry port that accepts a side-mount key blank carrier such as that illustrated in FIG. 10.
Figure 10:
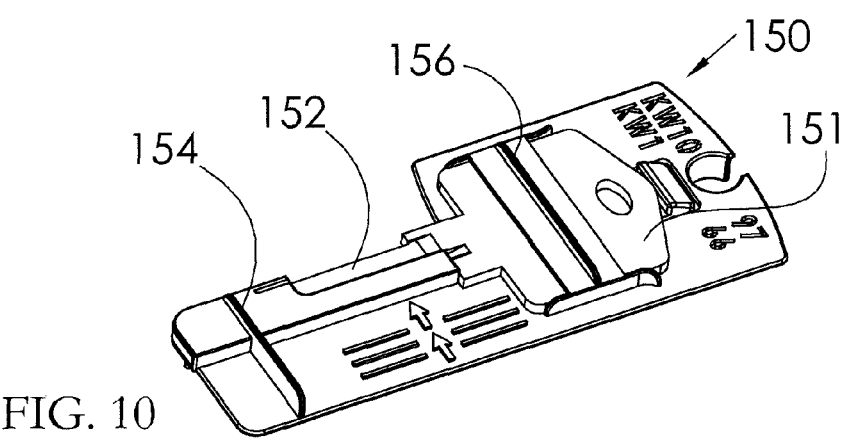
FIG. 10 illustrates a perspective view of a side-mount key blank carrier.

Other implementations of a key blank receiving aperture may receive a key blank 151 carrier 150 in a lateral rather than a frontal orientation. FIG. 10 illustrates a perspective view of a particular implementation of a key blank carrier 150 wherein the key blank carrier is configured for a side-mount insertion configuration. In a side-mount insertion configuration the key blank is inserted into a key blank cutter sideways with the key blank blade bit edge 152 facing the cutting wheel. A correspondingly oriented cutting wheel in the key cutter would be used. Alignment features 154, 156, embodied as ridges in this particular implementation, may be included on the key blank carrier as with other embodiments, but oriented so that the unique shape for mating with an appropriately configured key blank receiving aperture 158 with corresponding alignment features 160, 162 (FIG. 11).

FIGS. 12A, 12B illustrate front, and right views of a key blank 170 in a particular implementation of a key blank carrier 172 wherein the key blank carrier comprising a key blank recess 174 configured to receive a key blank head 176. The key blank carrier 172 of this embodiment comprises key blank carrier alignment features 178 adapted to interface with a front side of a key cutting system. FIG. 13 illustrates a particular implementation of a key duplication system 182 wherein the key blank receiving aperture 184 comprises at least one mechanically engaging feature 186, such as a clip or flexible or moveable engaging finger, adjacent to the key blank receiving aperture entry port. Once the key blank blade 170 is fully inserted into the key receiving aperture 184, the engaging feature 186 engages a corresponding portion 178 on the carrier flag, restricts the key blank 170 from moving while it is being cut and confirms that the key blank blade has been fully inserted.

FIG. 13 illustrates a non-limiting example of how one might configure a key duplication housing 182 comprising mating features 186 outside of the duplication system and adjacent to the key receiving aperture 184. The mating features outside of the housing may comprise a key blank carrier clamp configured to mate with alignment features 178 (shown in FIGS. 11A, 11B) on the key blank carrier 172. The mating features 186 on the key duplication housing confirm that the key blank packaging has been fully inserted into the key duplication housing 182, engage the key blank and restrict the key blank from being removed from the key duplication housing carrier during the cutting process.

Figure 14:
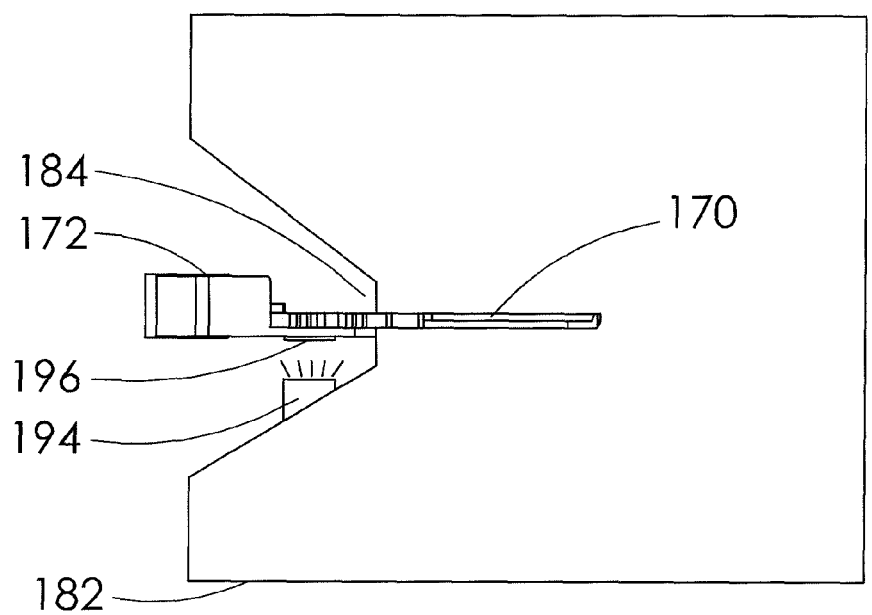
FIG. 14 illustrates a simplified side view of a key receiving aperture similar to that of FIG. 13, but illustrating a bar code reader adjacent to the key receiving aperture.

FIG. 14 illustrates a particular implementation of a key duplication system 182 wherein at least one key carrier receiving aperture 184 is coupled with a digital reader 194 positioned to read the code 196 affixed on a key blank carrier 172 (FIG. 12B). Use of a code 196 on the key blank carrier 172 may be used for many purposes including, but not limited to, confirming that the key blank carrier 172 is positioned appropriately in the key receiving aperture and ready for cutting, and that the correct key blank is inserted into the key cutter in relation to the master key to be duplicated. The code 196 may be any code including, but not limited to, a bar code, magnetic code, alphanumeric code or any other computer readable code. In particular implementations of a key carrier receiving aperture, the digital reader sends an activation signal to the key duplication housing only when a correct key blank is identified after the key carrier is fully inserted into the key carrier receiving aperture.

Figure 15:
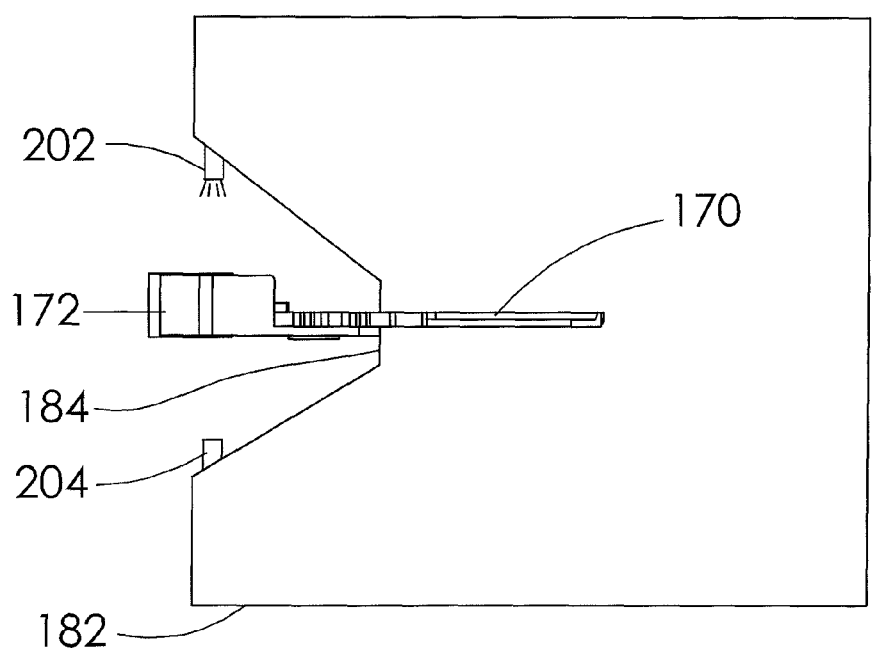
FIG. 15 illustrates a simplified side view of a key receiving aperture similar to that of FIG. 13 but illustrating a unidirectional emitting light coupled adjacent to the key receiving aperture.

As shown in FIG. 15, a particular implementation of a key duplication system 182 comprises a one directional emitting light 202 and receiver 204 adjacent to the key carrier receiving aperture 184 such that the light is oriented to pass a beam of light through an opening on a key blank carrier 172 as a verification process, to make sure that the key blank carrier is positioned fully into the key blank receiving aperture. One or all of the features included in the implementations of FIGS. 13-15 may be included in some particular implementations and are not mutually exclusive.

Figure 16:
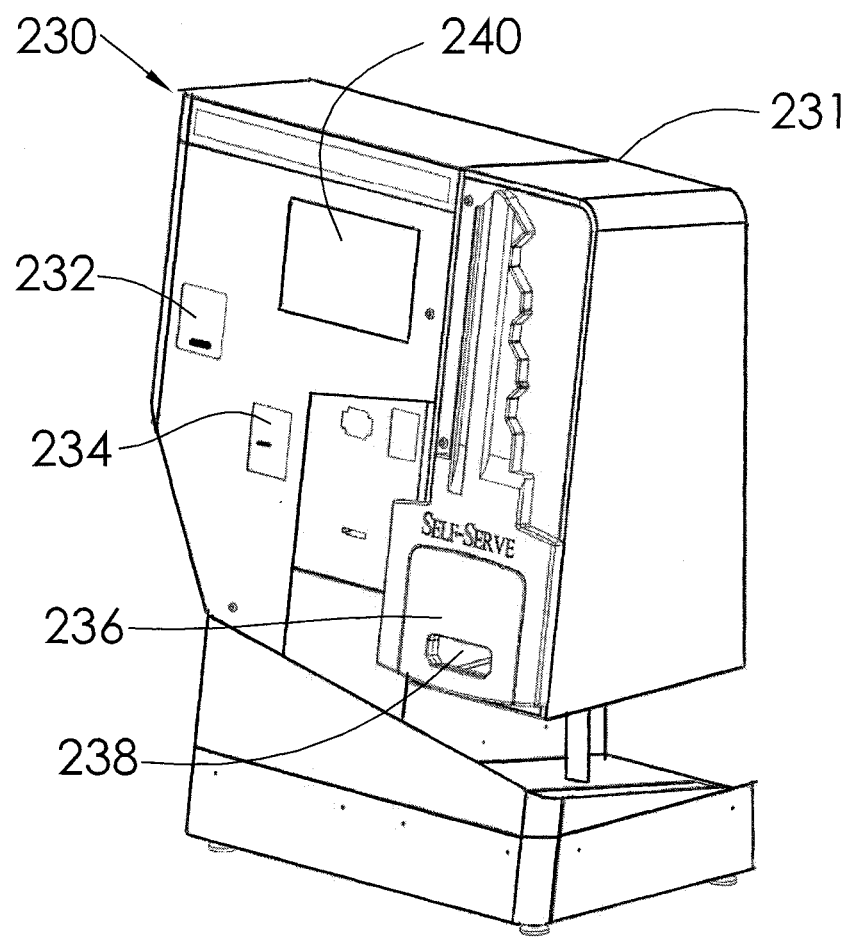
FIG. 16 illustrates an implementation of a key duplication machine housing including a key identification system, a key cutting system, and a key vending system operatively coupled together.

FIG. 16, Illustrates a particular implementation of a key duplication system 230 wherein a key duplication machine housing 231 may include a key identification system 232, a key cutting system 234, and a key blank vending system 236 operatively coupled together and associated with one or more computer processors running software operative to provide the functions needed to initiate the steps required for key duplication and customer interaction, as well as reporting functions and data transfer between the different systems as needed. In some implementations, duplicated keys or key blanks are vended from within the housing 231 through a key return 238. In some implementations, the keys are cut prior to being vended. In a particular implementation, a mechanical arm or other automation within the key blank duplication machine housing 231 automatically moves key blanks from a vending system storage to a cutting position and a key cutter cuts a key blank with the identified key pattern from a corresponding master key. In a particular implementation, a key blank receiving aperture such as one similar to that illustrated in FIGS. 7A-7D or FIG. 9 with tapered walls is included within the key blank duplication machine housing to assist in guiding the key blank and/or key blank carrier from a key vending machine once an appropriate key blank is selected by a consumer into the key blank receiving aperture with automation, such as a mechanical arm or other automated mechanical mover. The tapered walls to guide the key blank to the key blank receiving aperture not only assist consumers in inserting a key blank in implementations where it is included on an outside of the machine housing, it also simplifies the precision requirements of automation when included inside of the machine housing. Other implementations of a key duplication system may vend key blanks prior to being cut and a user may further be asked to insert the vended key blank into the cutting portion of the system for cutting.

By non-limiting example, an identification system coupled with the key duplication housing may collect information from a key blade using a laser micrometer sensor, a single photograph, metal reflectivity, through-beam sensor, or through-beam sensor traces. The information collected from the key blade then may be processed against the key information available in a database coupled to the key duplication housing, to determine the key type and the bit pattern of the key. In other implementations of a key duplication housing, a customer may be asked through an interface 240 to identify whether a key to be duplicated is a house, automobile, small lock, or other key. By allowing a customer to select a key type, smaller amount of data needs to be processed against the information available in the database, which may significantly reduce the processing time in identifying a key type. Other implementations of a key duplication housing may further comprise a display screen 236 directing a customer about steps to be taken to duplicate a key such as identifying a key type, selecting a key blank, placing a key blank into the key duplication housing, and removing a cut key from the key duplication housing.

In a particular implementations of a key duplication housing, a key vending system may be coupled with a key duplication machine in the same housing or it may have its own housing and only be controlled by a key duplication machine in order to facilitate the key blank dispensing. A particular key dispensing implementation may include snap-on motors to allow a blank key tray's adaptors interface with them. An implementation of blank key tray housing may include a small tray that holds a spiral adaptor coupled with a spiral rod, where the key blanks get stacked on top of one another and get hang from the spiral rod. By having detachable blank key trays, key blanks can be pre-mounted on the key tray housing and they can be inserted into a key despising machine quickly. In another implementation of a key dispensing machine, key blank packaging may be pre-mounted on the key tray housing before being placed into a key dispensing machine.

Certain implementations of key dispensing machine may include a magnetic coil in the key return tray. Existence of a key blank or other metallic object within the field causes a disruption to the magnetic field generated by the magnetic coil used as a sensor to indicate to the system that a metal object has been dispensed. Such magnetic coil may sometimes be used in combination with a vibration sensor to further enhance the detection capabilities of the system in relation to the return tray. Once the key is removed from the tray, the magnetic field returns to its undisrupted state and the user may be alerted that the key has been removed.

The components included in particular implementations of key blanks, carriers, system housing, vending returns, cutters, identifiers and the like may be formed of any of many different types of materials or combinations that can readily be formed into shaped objects and that are consistent with the intended operation. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing. From the descriptions provided herein, those of ordinary skill in the art will readily be able to determine the components needed to assemble a system.

Furthermore, the various components forming particular implementations and embodiments may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

It will be understood that implementations are not limited to the specific components disclosed herein, as virtually any components consistent with the intended operation of a method and/or system implementation may be utilized. Accordingly, for example, although particular characteristics of components may be disclosed, such components may comprise any shape, size, style, type, model, version, class, grade, measurement, concentration, material, weight, quantity, and/or the like consistent with the intended operation of a method and/or system implementation may be used.

In places where the description above refers to particular implementations, it should be readily apparent that a number of modifications may be made without departing from the spirit thereof and that these implementations may be applied to other implementations. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A key duplication system comprising:
a key duplication system housing;
at least one key blank receiving aperture sized to receive at least a key blank blade wherein the at least one key blank receiving aperture is located on a surface of a first side of the key duplication system housing;

at least one cutter within the housing adjacent to the at least one key blank receiving aperture; and at least one key blank carrier clamp adjacent to the at least one key blank receiving aperture, the at least one key blank carrier clamp positionable to securely contact an outer surface of a key blank carrier;

wherein the key blank blade is guided to a predetermined position in relation to the at least one cutter through mechanical engagement of the outer surface of the key blank carrier and at least a portion of the key blank receiving aperture;

wherein the key blank carrier clamp is positionable to clamp the key blank carrier in a cutting position in relation to the at least one cutter; and wherein the key blank blade is in the predetermined position when the key blank carrier is in the cutting position.

2. The key duplication system of claim 1, wherein the at least one key blank receiving aperture comprises a perimeter shape configured to match a corresponding shape of the cross sectional outer surface of the key blank carrier.

3. The key duplication system of claim 2, wherein the perimeter shape comprises at least one of a ridge or groove configured to match a corresponding groove or ridge on the outer surface of the key blank carrier.

4. The key duplication system of claim 1, wherein the at least one key blank receiving aperture comprises a plurality of angled surfaces adjacent to the at least one key blank receiving aperture, the plurality of angled surfaces each angling away from the at least one key blank receiving aperture to form a tapered entry port between a user and the at least one key receiving aperture.

5. The key duplication system of claim 1, wherein the at least one key blank receiving aperture is configured to receive the key blank carrier into the at least one key blank receiving aperture either in an orientation in which a tip end of the key blank carrier is inserted first or in an orientation in which a bit edge of the key blank is inserted first.

6. The key duplication system of claim 1, further comprising a digital reader coupled to the housing and angled toward the at least one key blank receiving aperture, the digital reader positioned to read an identification code affixed on an outer surface of the key blank carrier when the key blank blade is received by the at least one key blank receiving aperture.

7. The key duplication system of claim 1, further comprising a light adjacent to the at least one key receiving aperture and oriented to pass a beam of light through an opening placed on the key blank carrier when the key blank carrier is positioned at a fully inserted position into the at least one key blank receiving aperture.

8. The key duplication system of claim 1, further comprising at least one movable guard adjacent to the at least one key blank receiving aperture, the at least one movable guard movable to block at least a portion of the at least one key blank receiving aperture.

9. The key duplication system of claim 1, further comprising a pressure sensor coupled to the housing and positioned for activation by the key blank when the key blank carrier is positioned at a fully inserted position into the at least one key blank receiving aperture.

10. The key duplication system of claim 1, wherein the at least one key blank receiving aperture further comprises a pivotal support, wherein at least a portion of the at least one key blank receiving aperture is configured to be pivotable around an axis corresponding to the center axis of at least one of the key blank blade or the key blank carrier.

11. The key duplication system of claim 1, wherein the at least one key blank carrier clamp is further positioned to engage a portion of the outer surface of the key blank carrier extending from the key blank head.

12. The key duplication system of claim 11, wherein the at least one key blank carrier clamp is further positioned to engage a portion of the key blank carrier in direct contact with the key blank blade.

13. The key duplication system of claim 1, where the at least one cutter comprises a constant speed motor driving a cutting wheel.

\* \* \* \* \*